(12) United States Patent
Pesce et al.

(10) Patent No.: US 10,679,283 B1
(45) Date of Patent: Jun. 9, 2020

(54) PROVIDING DIGITAL REPRESENTATIONS BASED ON PHYSICAL ITEMS

(71) Applicant: Amazon Technologies, Inc., Reno, NV (US)

(72) Inventors: Michael Schleif Pesce, Seattle, WA (US); Ethan Zane Evans, Snoqualmie, WA (US); Michael Anthony Frazzini, Seattle, WA (US); Michael Martin George, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 659 days.

(21) Appl. No.: 14/318,273

(22) Filed: Jun. 27, 2014

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0623* (2013.01)

(58) Field of Classification Search
CPC . G06Q 30/0643; G06Q 30/02; G06Q 30/0603
USPC ............................... 705/26.1, 27.1
See application file for complete search history.

(56) References Cited

U.S. PATENT DOCUMENTS

| | | | |
|---|---|---|---|
| 8,473,382 B2 | 6/2013 | Jung et al. | |
| 8,512,140 B1 | 8/2013 | Omi | |
| 8,645,230 B2 | 2/2014 | Oliver | |
| 8,758,109 B2 | 6/2014 | Lutnick | |
| 9,317,669 B1 * | 4/2016 | Gray | G06F 21/31 |
| 9,317,981 B2 | 4/2016 | Friedrich | |
| 9,597,584 B1 | 3/2017 | George et al. | |
| 2008/0086382 A1 * | 4/2008 | Ur | G06Q 20/102 705/27.2 |
| 2009/0227368 A1 | 9/2009 | Wyatt | |
| 2010/0113145 A1 | 5/2010 | Yan et al. | |

(Continued)

FOREIGN PATENT DOCUMENTS

WO    2008124941    4/2008

OTHER PUBLICATIONS

Gnaz, "Patent Issued for Method for Disabling and Re-enabling Third-Party Ads," Marketing Weekly News, (Jun. 6, 2015), 391.*

(Continued)

*Primary Examiner* — Brandy A Zukanovich
(74) *Attorney, Agent, or Firm* — Robert C. Kowert; Kowert, Hood, Munyon, Rankin & Goetzel, P.C.

(57) ABSTRACT

Methods and apparatus for collecting information for physical products by providing virtual products to customers. Virtual products (digital representations of physical products) may be provided to customers that provide item information including but not limited to evidence of ownership of corresponding physical products, for example photographs or sales receipts. The customers may use the virtual products in various applications in which the customers may establish a virtual presence. The information provided by the customers may be collected, analyzed, and applied in one or more areas of real-world production and marketing, for example in obtaining competitive pricing information. Digital lockers may be provided for the customers to which the virtual products are stored; the applications may access the virtual products for a customer from a respective digital locker.

20 Claims, 15 Drawing Sheets

(56) References Cited

U.S. PATENT DOCUMENTS

| | | | | |
|---|---|---|---|---|
| 2010/0257071 A1* | 10/2010 | Bokor | ............... | G06Q 10/087 |
| | | | | 705/28 |
| 2011/0213482 A1 | 2/2011 | Saarela | | |
| 2012/0244948 A1 | 3/2012 | Dhillon | | |
| 2012/0122572 A1 | 5/2012 | Kelly et al. | | |
| 2012/0239513 A1* | 9/2012 | Oliver | ............ | G06Q 30/0643 |
| | | | | 705/14.73 |
| 2013/0231999 A1 | 8/2013 | Emrich | | |
| 2014/0129394 A1 | 1/2014 | Oliver | | |
| 2014/0351163 A1* | 11/2014 | Tussy | ............... | G06Q 10/083 |
| | | | | 705/330 |
| 2015/0332233 A1* | 11/2015 | Hurni | .................. | G06Q 30/06 |
| | | | | 705/26.35 |
| 2017/0296921 A1 | 10/2017 | Graham et al. | | |

OTHER PUBLICATIONS

Amar, Nir, et al. "Synthesizing reality for realistic physical behavior of virtual objects in augmented reality applications for smartphones." Virtual Reality (VR), 2013 IEEE. IEEE, 2013, pp. 1-2.
Lok, Benjamin, et al. "Incorporating dynamic real objects into immersive virtual environments." Proceedings of the 2003 symposium on Interactive 3D graphics. ACM, 2003, pp. 31-40.
"Unity Manual", accessed Jun. 27, 2014, pp. 1-32.

\* cited by examiner

PROVIDING DIGITAL REPRESENTATIONS BASED ON PHYSICAL ITEMS

BACKGROUND

Evolution of the Internet, web-based computing, and mobile computing, including the increasingly widespread availability of broadband connections and the availability and capabilities of consumer computing devices including but not limited to mobile computing devices such as pad/tablet devices and smartphones, has led to continuing evolution and growth of online applications such as online games, social media applications, and so on in which users may establish a web presence within a virtual community. As an example, online games, may allow one, two, or more players, in some cases even thousands of players, to simultaneously participate in a game from consumer devices coupled to a network. Online games may include everything from relatively simple, two-dimensional (2D) casual games to more complex 2D or three-dimensional (3D) action or strategy games that may involve one or more players in a game session, to world-building multiplayer games, to complex 3D massively multiplayer online games (MMOGs) such as massively multiplayer online role-playing games (MMORPGs) that may simultaneously support hundreds or thousands of players in a persistent online virtual world or universe.

In addition, the evolution and availability of technology has led to the continuing growth of online sales. Product producers and service providers make any number of physical products or services available to customers over intermediate networks such as the Internet via web sites, web applications, mobile applications and so on. Physical products or services may be offered online via websites or applications of the product producers or service providers, or may be offered via websites or applications of online merchants that offer products and/or services from many different providers to their customers.

Figure 1:
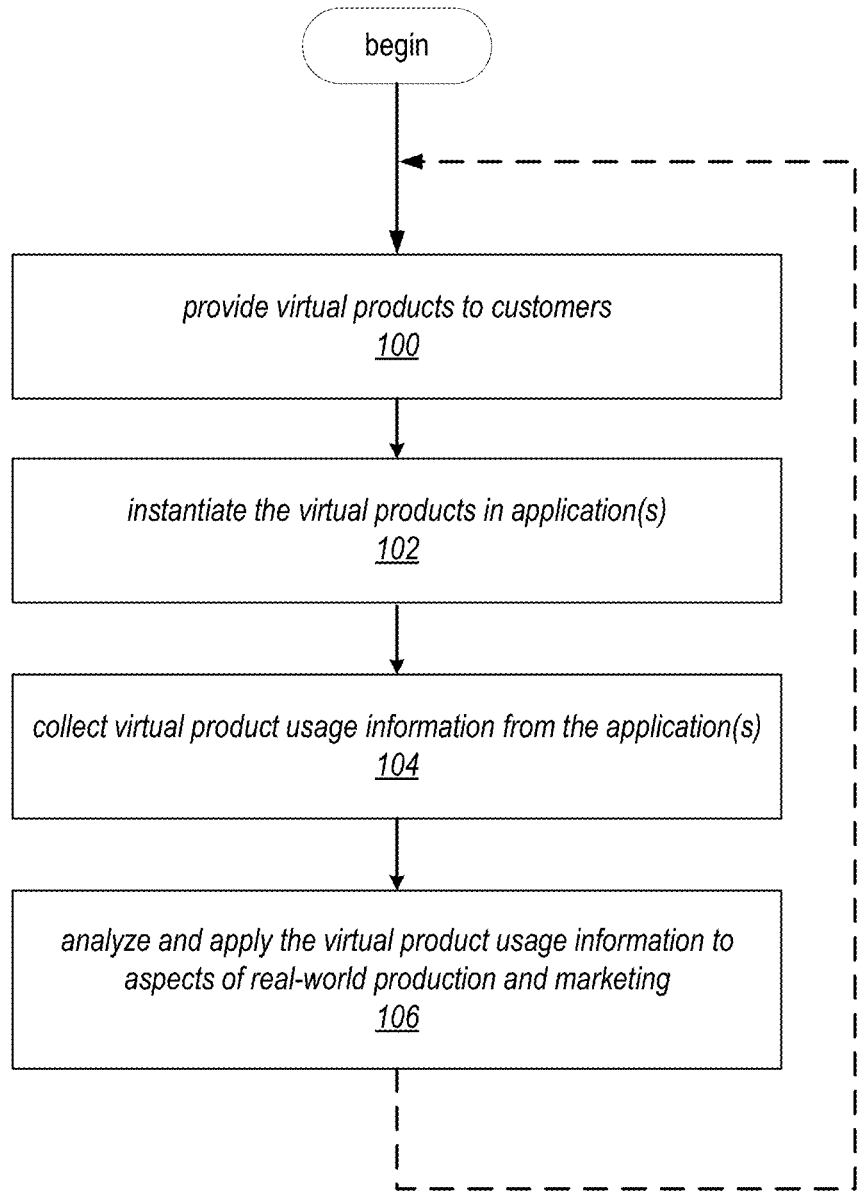
FIG. 1 is a high-level flowchart of a method for virtual product distribution, monitoring, and analysis, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing digital representations of real-world, physical products to customers for use in various applications as virtual products, and for collecting, analyzing, and applying usage information for the virtual products in the applications to various aspects of real-world production and marketing, are described. In embodiments, various product providers (e.g., manufacturers, producers, vendors, merchants, etc.) may provide digital representations of physical products (referred to herein as virtual products) to customers (also referred to as users or clients). For example, in some embodiments, a product provider may provide virtual products to customers that also purchase the physical products from the product provider. As another example, in some embodiments, a product provider may provide virtual products to customers in response to photographs, scans, or other descriptive information of physical items provided to the product provider. In some embodiments, the photographs or other descriptive information of physical items provided to the product provider may be provided as evidence of purchase or ownership of the physical items to the product provider. The customers may use the virtual products in various applications that present a virtual universe in which the customers may establish a virtual presence, for example online, multiplayer game systems and social media applications. Usage of the virtual products in the applications may be monitored, and usage information for the virtual products may be collected and analyzed. The usage information may, for example, be applied in one or more areas of real-world production and marketing such as product design, manufacturing, distribution, advertising, and so on. In addition, information provided by the customers to obtain virtual products, for example information such as receipts, invoices, scans, or photographs, may be leveraged in one or more areas of real-world production and marketing. In addition, virtual representations of a vendor's products that are used by customers within a multi-user environment such as an online gaming or social media environment may serve to advertise those products and that vendor to other customers that participate in the environment.

A virtual product as described herein may be any digital representation of a physical product, item, or object. A virtual product may be any type of digital representation from static or animated 2D or 3D digital images or graphics to complex 2D or 3D models (e.g., computer-aided design (CAD) models, computer-generated imagery (CGI) models, etc.) that may, for example, be instantiated, rendered, and in some cases animated and manipulated within virtual universes by game or physics engines.

The physical products for which digital representations may be provided as described herein may be any physical product, item or object. As non-limiting examples, the physical products may include vehicles and vehicle accessories, consumer electronic devices, entertainment devices, toys, sports equipment, recreational equipment, appliances, tools, apparel, furniture, or in general any real-world, physical product or item that may be represented by a virtual product or item within a virtual universe as described herein.

The physical products for which digital representations may be provided as described herein may include branded or trademarked products of various vendors. In some embodiments, an entity such as an online merchant that provides digital representations of physical products to customers may obtain permission from a vendor, or make an agreement with a vendor, to allow the entity to provide digital representations of the vendor's branded products to customers for use within applications. In some embodiments, brand or product names, trademarks, or other identifying marks may be obscured or removed from the digital representations of at least some products that are provided to customers. In some embodiments, instead of providing exact digital representations of a vendor's products to customers, the entity may provide generic digital representations that may look and behave similar to, but are not identifiable as, the vendor's actual products.

In some embodiments, instead of or in addition to providing digital representations of physical products to customers, digital representations of real-world services may be provided as virtual services to customers within virtual universes such as game universes, for example in response to the customers subscribing to or using the real-world service or providing evidence that they subscribe to or use the real-world service. As a non-limiting example, a customer may use a delivery service in the real world to deliver or receive physical goods. By utilizing the real-world service, or by providing evidence that the real-world service has been used, a digital representation of the service may be made available as a virtual service for the customer's use within a game universe.

In some embodiments, an entity such as an online merchant may provide at least some virtual products to customers for free. However, in some embodiments, customers may be required to pay for at least some of the virtual products that are provided.

FIG. 1 is a high-level flowchart of a method for virtual product distribution, monitoring, and analysis, according to at least some embodiments. As indicated at 100, virtual products may be provided to customers, for example customers of a product provider such as an online merchant illustrated in FIG. 12. For example, an online merchant may provide a number of physical products from any number of providers for sale to customers via web sites, web applications, mobile applications and so on, and may maintain a product catalog that includes 2D or 3D graphical representations, models, or images of at least some of the physical products offered for sale by the online merchant. At least some of these digital representations of the physical products may be provided as virtual products to at least some customers of the online merchant for use in other applications as described herein. While online merchants are used as an example of a product provider as a source for virtual products, note that digital representations of products may be provided as virtual products to customers from other product providers, for example directly from the manufacturers or producers of the physical products.

Figure 2:
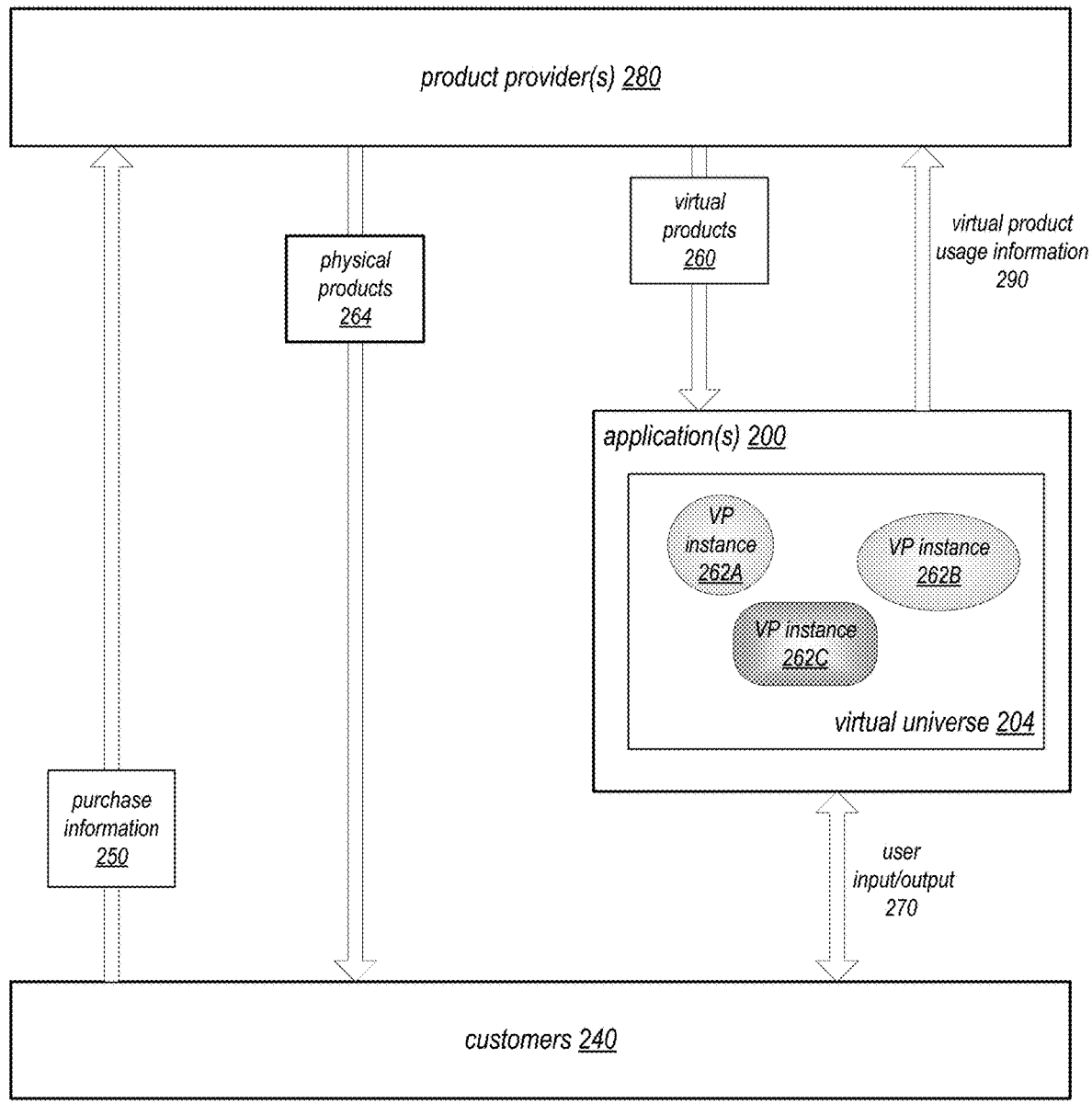
FIG. 2 graphically illustrates distributing virtual products to customers with purchased physical products, according to at least some embodiments.
Figure 6:
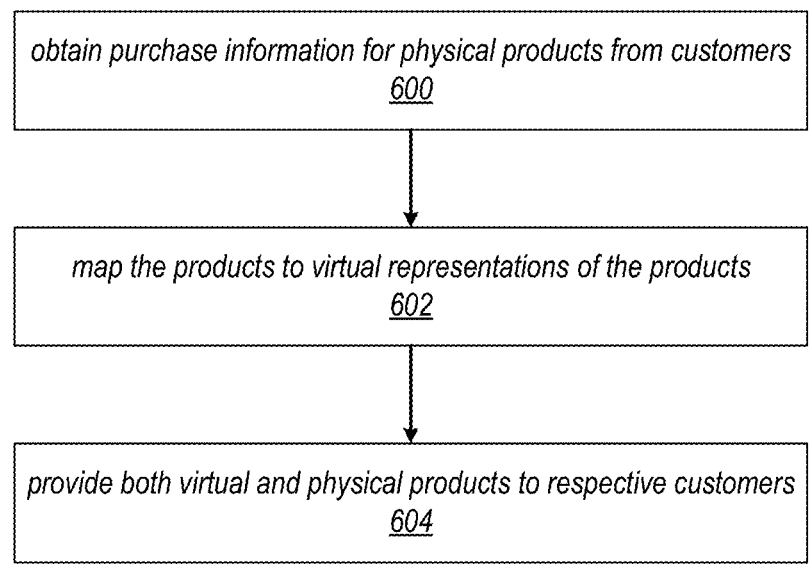
FIG. 6 is a flowchart of a method for distributing virtual products to customers with purchased physical products, according to at least some embodiments.

In at least some embodiments, virtual products may be provided by a product provider to customers that also purchase the physical products from the product provider. FIGS. 2 and 6 illustrate distributing virtual products to customers with purchased physical products, according to at least some embodiments. In some embodiments, for at least some physical products offered via a product provider, a digital representation of the product is provided to a customer that purchases the physical product for use as a virtual product in various applications such as online games and social media applications. In some embodiments, at least some virtual products may only be provided to a customer upon the customer purchasing the physical product. Offering a virtual product with the purchase of a physical product may, for example, provide incentive for some customers to purchase the actual particular physical products.

Figure 3:
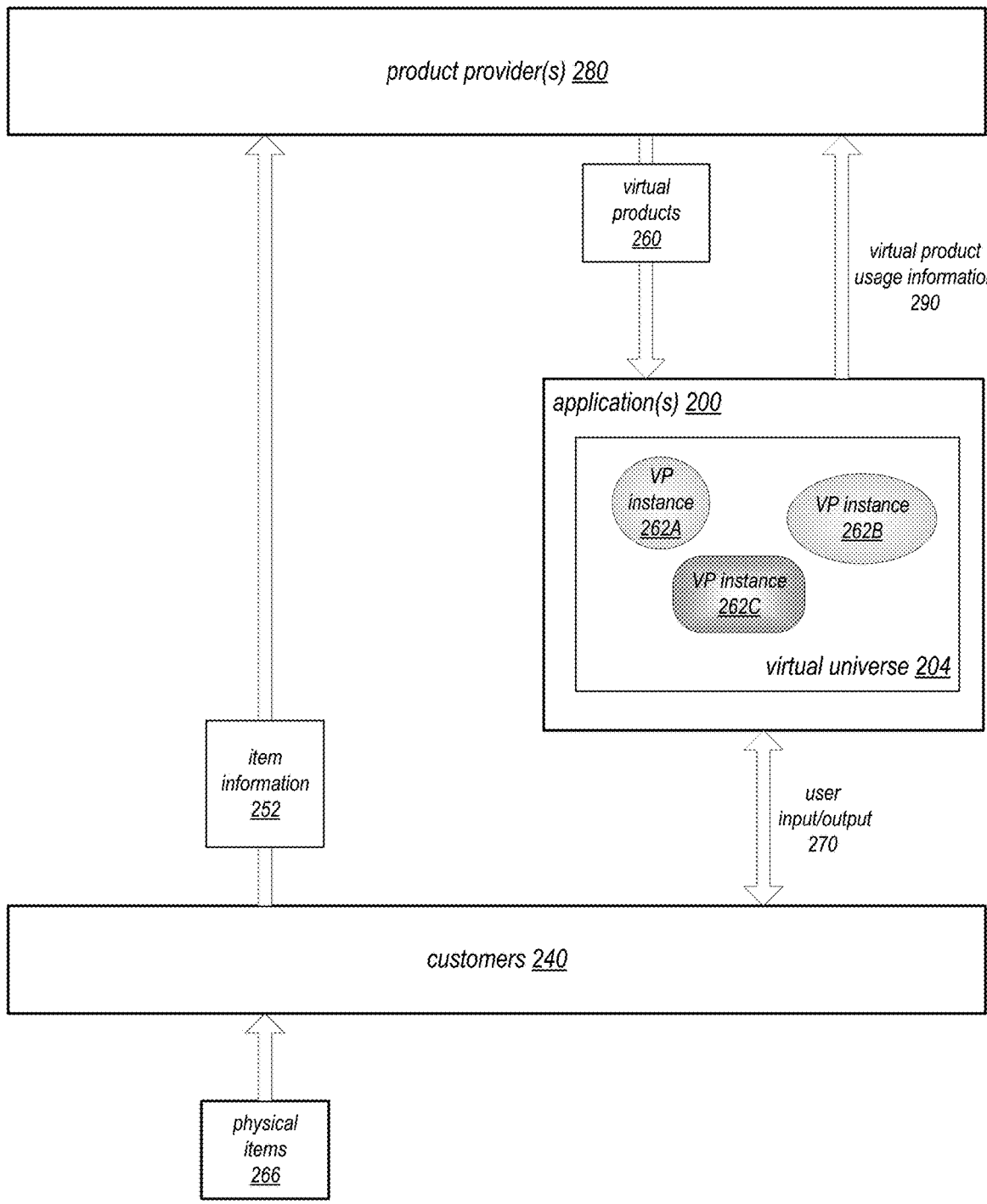
FIG. 3 graphically illustrates distributing virtual products to customers in response to item information provided by the customers, according to at least some embodiments.
Figure 7:
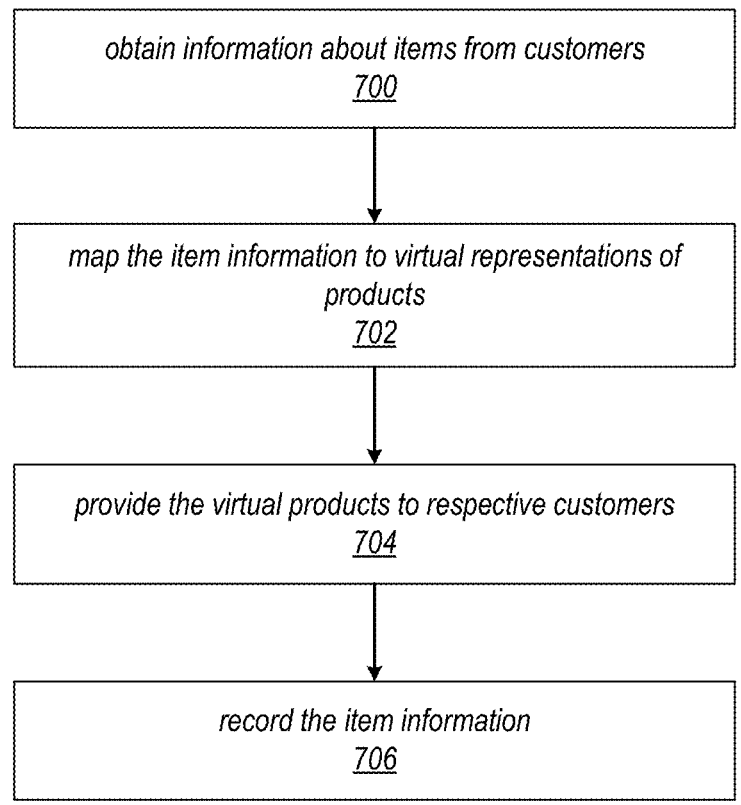
FIG. 7 is a flowchart of a method for distributing virtual products to customers in response to item information provided by the customers, according to at least some embodiments.

FIGS. 3 and 7 illustrate distributing virtual products to customers in response to item information provided by the customers, according to at least some embodiments. In at least some embodiments, a product provider may provide virtual products to customers in response to item information such as photographs, scans, or other images of or descriptive information for physical items presented to the product provider. The physical item for which the item information is provided may be, but is not necessarily, owned by or in the possession of the respective customer. The item information provided for a physical item to obtain a virtual product may include one or more of, but is not limited to, one or more digital photographs of the physical item or of packaging for the physical item, product names or numbers, scans of barcodes, UPC codes, or other product codes, or any other representation, documentation or data that may identify and/or describe the physical item. As an example, a customer may take digital photographs of, or otherwise obtain digital images of, one or more items at the customer's residence and submit the photographs to a product provider to obtain virtual products corresponding to the items. As another example, a customer may take or otherwise obtain digital photographs of one or more items at a friend's or relative's house, in a park, on the street, or in general at any public or private venue or site, and submit the photographs to a product provider to obtain virtual products corresponding to the items.

In some embodiments, for at least some products, actual purchase or ownership of the products may be required to obtain corresponding virtual products. In these embodiments, at least some of the item information provided by a customer may provide evidence of purchase or ownership of the physical items to the product provider. The actual physical items may have been purchased from the product provider, or may have been purchased from another online or brick-and-mortar vendor. The evidence of purchase or ownership may include, but is not limited to, digital photographs of the physical products in the customer's possession (e.g., at the customer's residence, office, etc.), documentation indicating that the client has purchased the physical product including but not limited to electronic sales receipts, invoices, digital copies or photographs of sales receipts or invoices, product and serial numbers, scans of barcodes, UPC codes, or other product codes, and/or digital representations of other documentation or data that may indicate purchase or ownership of physical items. Using this method, a product provider such as an online merchant may obtain information about when, where, and how customers have purchased physical products that they own, what they paid for the products, what options or accessories they purchased with or use with the physical products, what other products they purchased with or use with the products, or in general any information that can be obtained from the provided evidence of purchase or ownership such as sales receipts, photographs, and so on.

The item information may, for example, be provided to the product provider via one or more digital channels in various embodiments. For example, the item information may be emailed to the provider, uploaded to a website of the provider, or otherwise digitally transmitted to the provider. As an example, a product provider may provide an application or service via which a customer may submit or upload item information including but not limited to digital photographs to the product provider. While digital channels may generally be used to provide the item information, in some implementations physical channels may instead or in addition be used to provide the item information. For example, in some implementations, a customer may send an original or photocopy of a receipt for a product and/or an actual photograph of the product in an envelope through the mail to the provider to obtain a virtual product online for use in online applications.

In at least some embodiments, a product provider may provide virtual products to customers based on previous purchase information obtained from other sources than the customers. For example, an online merchant may review previous sales records that it maintains (or obtains from other sources such as other vendors) and provide or offer virtual products to at least some customers based on their previous purchases of the physical products or of similar or related products.

Figure 4:
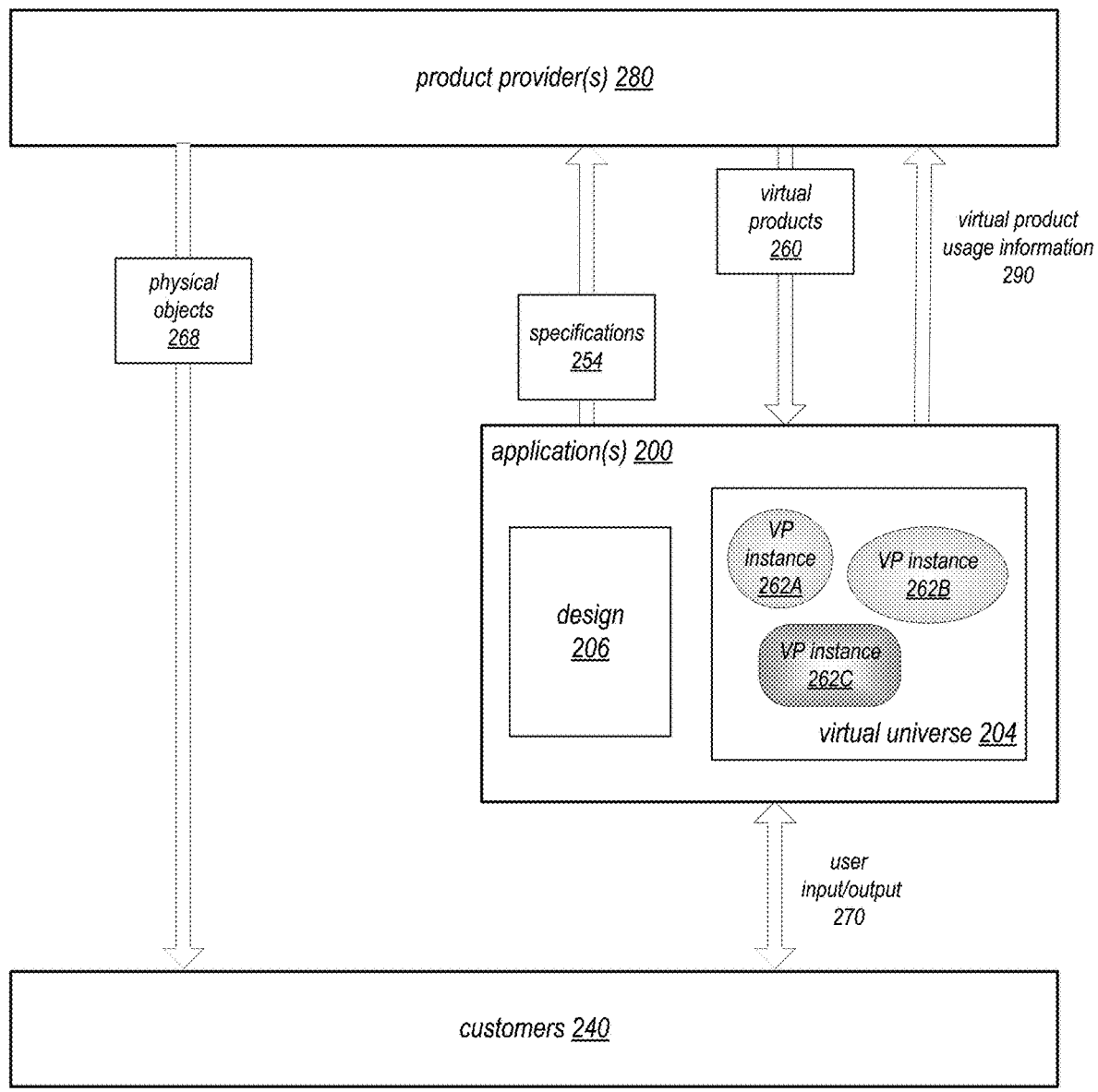
FIG. 4 graphically illustrates distributing virtual products and physical products to customers in response to customer design information, according to at least some embodiments.
Figure 8:
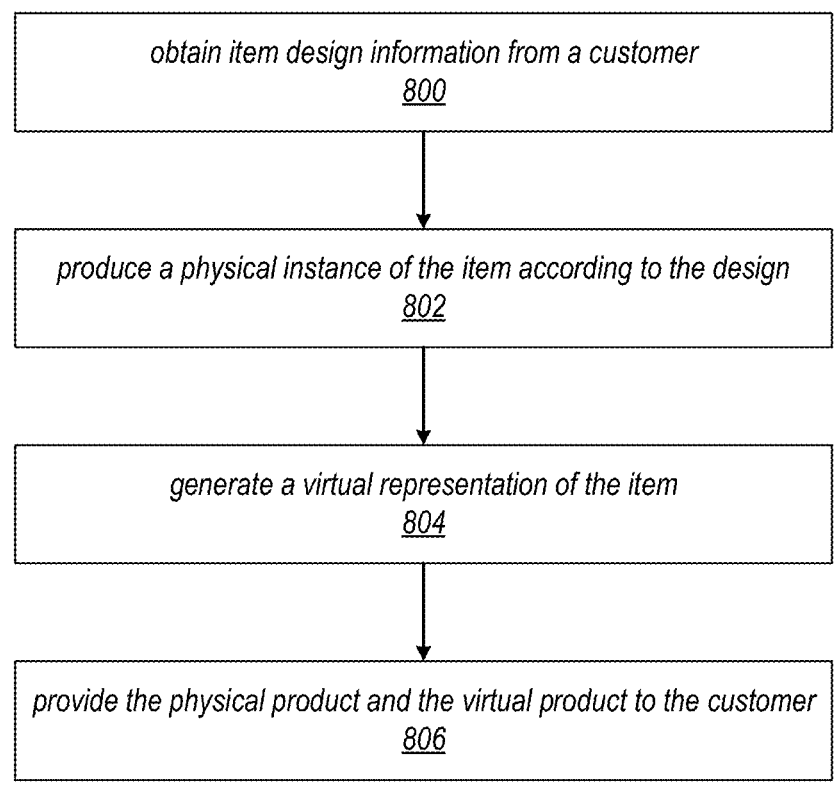
FIG. 8 is a flowchart of a method for distributing virtual products and physical products to customers in response to customer design information, according to at least some embodiments.

In at least some embodiments, a virtual product may be provided by a product provider in response to a customer providing a design for a physical product and purchasing an instance of the physical product based on the design. FIGS. 4 and 8 illustrate distributing virtual products and physical products to customers in response to customer design information, according to at least some embodiments. As an example, a product provider may provide a "print on demand" service whereby 3D printing technology may be used to print physical objects based on input designs. A customer may use a design interface in a game or other application to design a product, submit the design to the product provider, and purchase an instance of the physical object. The product provider may use 3D printing technology (or other technology) to produce the physical instance of the object, and may also generate a digital representation of the object. The virtual object may be provided to the customer along with the physical object, and may be instantiated and used in various applications and games.

As indicated at 102 of FIG. 1, instances of the virtual products may be generated for and used by customers in one or more applications. The applications may include any online or mobile applications that present a virtual universe in which the customers may establish a virtual presence, and in which instances of virtual products may be generated. As non-limiting examples, the applications may include online, multiplayer game systems that present virtual game universes to players and in which the players may establish virtual characters or avatars, and social media and other online applications in which participants may establish and personalize avatars or other graphical representations of their online presence.

Obtaining and using virtual representations of a vendor's products within a multi-user environment such as an online gaming or social media environment may act to advertise those products and/or the vendor to other customers that participate in the environment. Thus, product providers may be encouraged to participate in embodiments by providing virtual products that represent their actual physical products as an advertising channel.

While use cases involving online applications such as online, multiplayer games are generally described, note that in some embodiments the virtual products that are provided to customers may be used in offline applications instead of or in addition to online applications, such as in single-player or multiplayer console games or other computer games that may be played offline.

As indicated at 104 of FIG. 1, virtual product usage information may be collected from the application(s). In at least some embodiments, an application in which the virtual products are used may include a monitoring and data collection component or module that monitors virtual product use in the application, collects the usage data, and that provides the usage data to one or more product providers or other external entities. In at least some embodiments, application programming interfaces (APIs) may be provided via which application developers (e.g., game developers) and product providers may establish interfaces, communications channels and protocols for communicating virtual product-related information including but not limited to the collected virtual product usage information.

In some embodiments, the usage information that is collected for the virtual products may include performance information related to how the virtual products perform in the virtual universe of the application. For example, in a game universe, a game engine may be used to simulate real-world performance for virtual products used within the universe, and virtual performance data may be collected for the products. In some embodiments, the usage information that is collected for the virtual products may instead or also include preference information for virtual products within the application. For example, the preference information collected within a game or social media application may indicate which virtual products are used most within the application, which modifications to virtual products are popular within the application, which combinations of virtual products are used within the application, what options or accessories are popular for the virtual products within the application, and so on.

As indicated at 106 of FIG. 1, the virtual product usage information may be analyzed and applied to aspects of real-world production and marketing. The usage information may, for example, be applied in one or more of product design, manufacturing, distribution, advertising, and so on for physical products. In addition, in some embodiments, item information provided by the customers, including but not limited to information presented as evidence of purchase or ownership, may be leveraged and applied in one or more areas of real-world production and marketing. Example use cases for applications of the usage information and item information are provided later in this document.

The elements of FIG. 1 are explained in more detail in relation to FIGS. 2 through 13.

Figure 12:
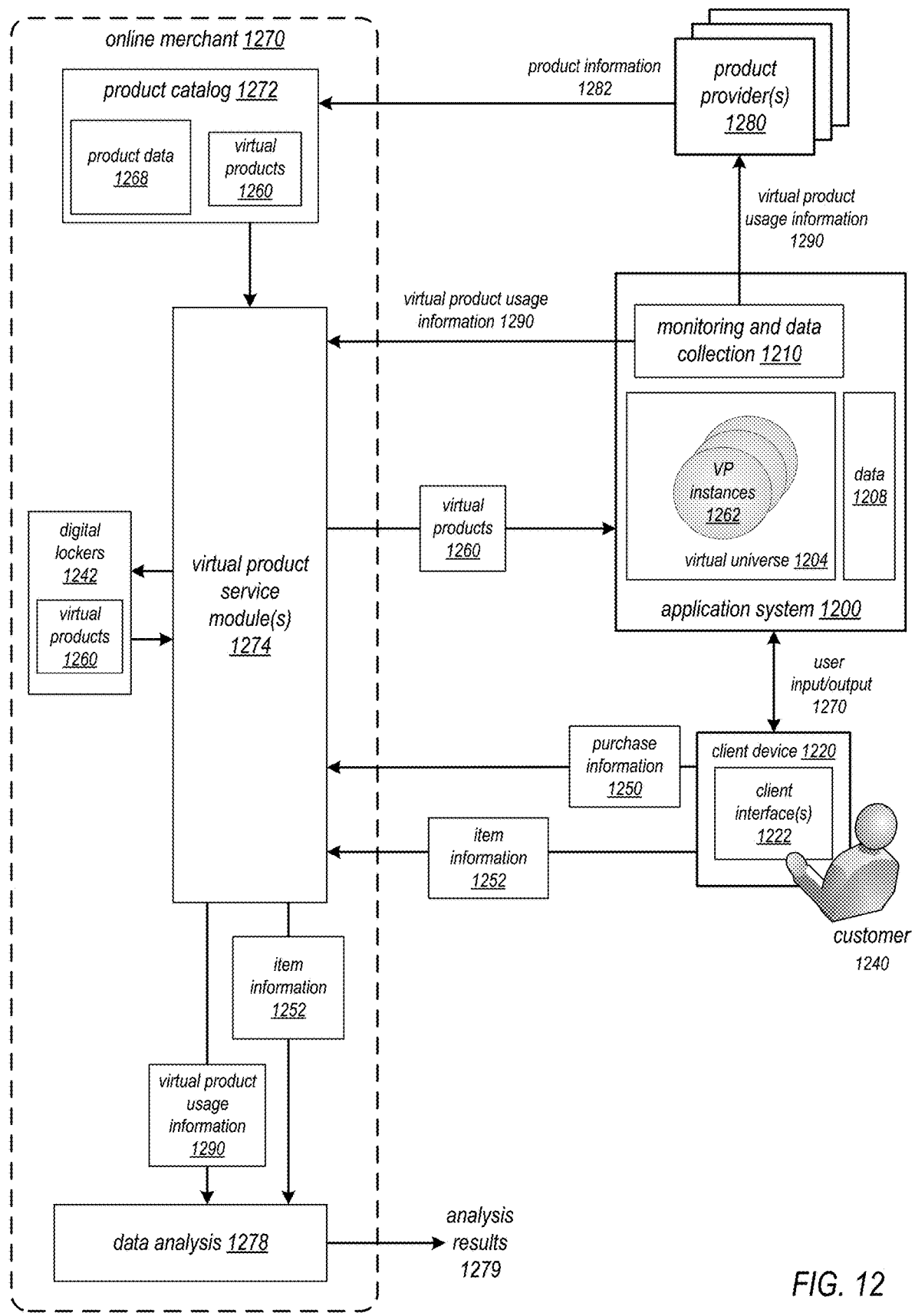
FIG. 12 illustrates an example network environment in which embodiments may be implemented.

FIGS. 2 through 5 graphically illustrate various example methods for providing digital representations of physical products to customers. In FIGS. 2 through 5, both physical products 264 and virtual products 260 may be provided to customers 240 by one or more product providers 280. The virtual products 260 may be instantiated as virtual product (VP) instances 262 in various applications 200. A product provider 280 may, for example, be an online merchant or vendor as illustrated in FIG. 12 that offers physical products 264 from any number of other entities (manufacturers, vendors, distributors, producers, resellers etc.) for sale to customers 240 via web sites, web applications, mobile applications, and so on that are accessible by the customers using various consumer devices such as personal computers and mobile devices. A product provider 280 may maintain a product catalog that includes digital representations of at least some of the physical products 264 offered for sale, for example 2D or 3D graphical representations, models, or images of the products 264, and at least some of these digital representations may be provided as virtual products 260 to at least some customers 240 of the product provider 280 for use in other applications 200 as described herein. While online merchants are used as an example of a product provider 280 that provides both virtual 260 and physical 264 products to customers 240, note that in some implementations virtual products 260 may be provided to customers 240 by other product providers, for example directly from the manufacturers or producers of the physical products 264.

The digital representations of physical products 264 that are provided to customers 240 as virtual products 260 may be any type of digital representation from static or animated 2D or 3D digital scans, images, or graphics to complex 2D or 3D models of various types including but not limited to CAD and CGI models. As non-limiting examples, a digital representation may be anything from a 2D or 3D digital image or graphical representation of a physical product 264 to a complex 2D or 3D model of a physical product 264. The digital representations may be generated by the product provider 280 that provides the virtual products 260 to customers 240, or may be obtained from other sources. For example, an online merchant as illustrated in FIG. 12 may obtain virtual representations of products 264 from product manufacturers, distributors, or other entities for its product catalog, or may itself generate at least some of the digital representations for the catalog, for example by 2D or 3D scanning or imaging of examples of the products 264.

The digital representations of physical products 264 that are provided to customers 240 as virtual products 260 may represent the actual product 264. For example, if a customer 240 obtains a virtual product 260 corresponding to a particular physical product 264 that the customer 240 has purchased or otherwise obtained, the virtual product 260 may be a substantially accurate digital representation of the actual physical product 264. However, in some cases, a digital representation provided as a virtual product 260 may not be an exact image or model of the actual product 264. For example, a digital representation of the exact physical product 264 may not be available, and so a digital representation that is similar to a physical product 264 may be located or generated and provided as a virtual product 260. As examples, the virtual product 260 may be a digital representation of a physical item that is similar to but not the exact physical item, or a generic representation of a type of product or item rather than an accurate depiction of an actual product or item. As another example, brand or product names, trademarks, or other identifying marks may be obscured or removed from the digital representations of at least some products 264 that are provided to customers.

Applications 200 in which virtual products 260 may be instantiated as VP instances 262 may include any application that implements a virtual universe 204 in which customers 240 may establish a virtual presence and in which digital representations of objects, items, or products may be imported and rendered. As non-limiting examples, applications 200 may include online, multiplayer game systems that present virtual game universes to players and in which the players may establish virtual characters or avatars, and online social media sites and other online applications in which participants may establish and personalize avatars or other graphical representations of their online presence. In addition to online applications, application 200 may include offline applications such as in single-player or multiplayer console games or other computer games that may be played offline.

In FIGS. 2 through 5, VP instances 262A through 262C represent particular instances of virtual products 260 that are rendered within a virtual universe 204 of an application 200. Generally, each VP instance 262 may be associated with or owned by a particular customer 240 that participates in the virtual universe 204 of the application 200 via a web site, web application, mobile application, game client, or other interface provided by or for the application 200. As non-limiting examples, a VP instance 262 may be anything from a graphical representation of a particular article of apparel that the customer 240 has purchased and that is rendered on an avatar that the customer 240 uses in the virtual universe 204 of a social media application to a complex 2D or 3D model of a product such as an automobile that the customer 240 has purchased and that is rendered within a game universe 204 of a multiplayer game system. Customers 240 may manage, manipulate, or otherwise use their virtual products 260 and VP instances 262 in applications 200 via user input/output 270 to interfaces provided by the applications 200.

Figure 5:
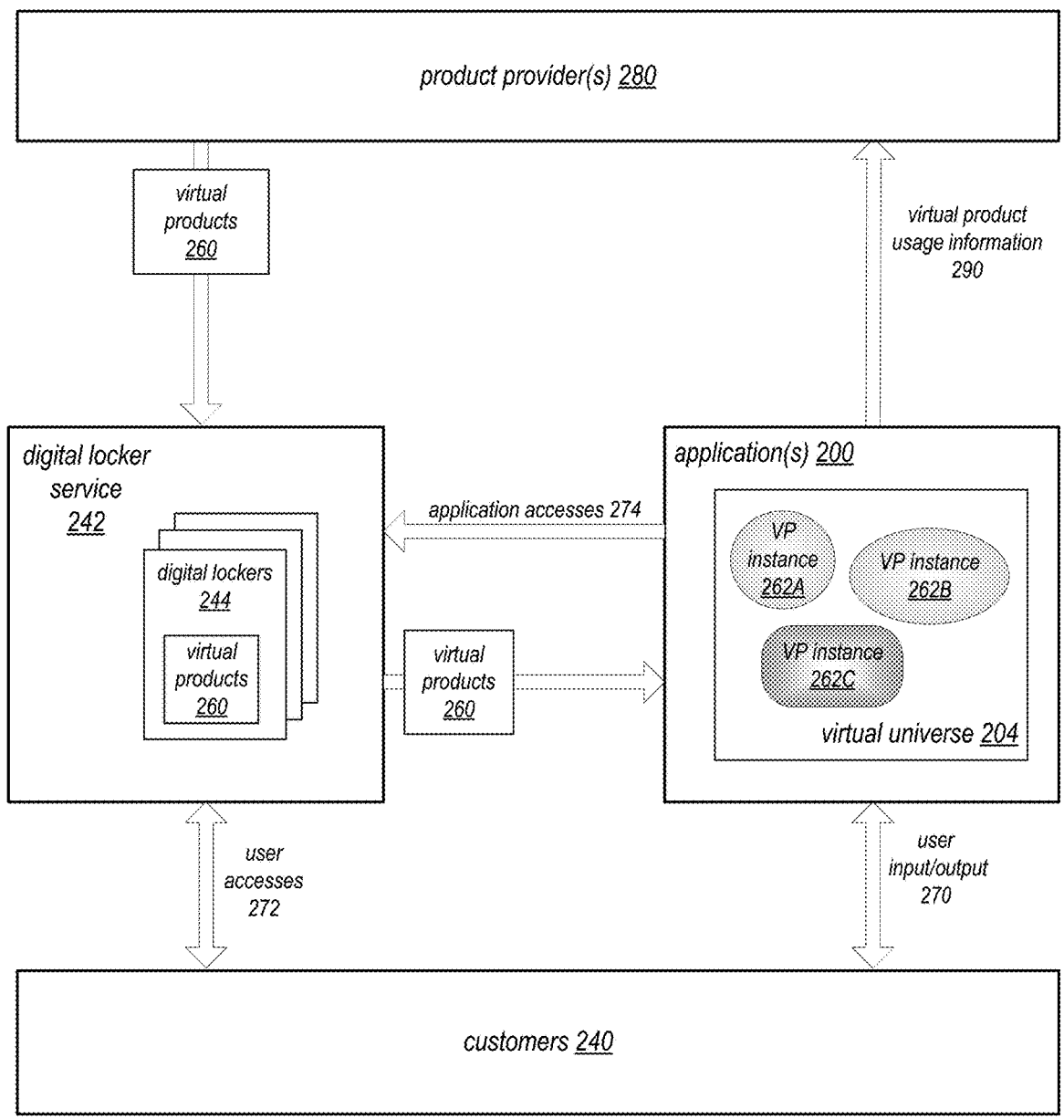
FIG. 5 graphically illustrates distributing virtual products through customers' digital lockers, according to at least some embodiments.

While FIGS. 2, 3, and 4 show virtual products 260 being provided directly to application(s) 200 from product provider(s) 280 to be rendered as VP instances 262 for customers 240, in some embodiments virtual products 260 may instead or in addition be provided directly to the customers 240. The customers 240 may then provide the virtual products 260 to one or more applications 200 to be rendered as VP instances 262 for the respective customers 240. As shown in FIG. 5, in some embodiments virtual products 260 may be stored in digital lockers associated with the customers 240, and may be accessed from the lockers by the customers 240 and/or by the applications 200.

In at least some embodiments, an application 200 may control, filter, or limit which virtual products 260 and/or how many virtual products 260 may be imported into the application 200 and instantiated as VP instances 262 within its virtual universe 204. As an example, an online, multiplayer racing game system may control or filter what types of vehicles or vehicle accessories that it allows to be imported into the game as virtual products 260 and rendered as VP instances 262 for use in racing. As another example, an application 200 may limit the number of VP instances 262 that a particular customer 240 can maintain in the universe 204 at a given time; the customer 240 may have to remove a VP instance 262 before adding a new VP instance 262.

As shown in FIGS. 2 through 5, customers 240 may manage, manipulate, or otherwise use their virtual products 260 and VP instances 262 in applications 200 via user input/output 270 to interfaces provided by the applications 200. Usage of the virtual products 260 in one or more of the applications 200 may be monitored, and usage information 290 for the virtual products 260 may be collected and analyzed. The usage information 290 may, for example, be sent to or collected by one or more of the product providers 280, and may be applied in one or more areas of real-world production and marketing such as product design, manufacturing, distribution, advertising, and so on. In addition, information provided by the customers, for example item information including but not limited to receipts or photographs provided as evidence of purchase or ownership of physical items as illustrated in FIG. 3, may be collected, analyzed, and applied in one or more areas of real-world production and marketing such as advertising. Example use cases for applications of the usage information 290 are provided later in this document.

FIG. 2 graphically illustrates distributing virtual products 260 to customers 240 with purchased physical products 264, according to at least some embodiments. In these embodiments, a product provider 280 may provide virtual products 260 to customers 240 that also purchase physical products 264 from the product provider 280. As shown in FIG. 2, a customer may provide purchase information 250 to a product provider 280 via a web site, web application, mobile application, or other interface to specify and purchase one or more physical products 264. In some embodiments, for at least some physical products 264 purchased from a product provider 280, a corresponding virtual product 260 may also be provided to the customer 240 that purchases the physical product 264. In some embodiments, at least some virtual products 260 may only be provided to a customer 240 upon the customer 240 purchasing the physical product 264 from the product provider 280. The virtual product 260 may be used in various applications 200 such as online games and social media applications. Offering a virtual product 260 with the purchase of a physical product 264 may, for example, provide incentive for some customers 280 to purchase the particular physical products 264.

While FIG. 2 shows customers 240 submitting purchase information 250 directly to product providers 280, in some embodiments at least some purchase information 250 may be submitted to a product provider 280 via an interface provided to the customers 240 by an application 200. For example, an application 200 such as an online game may provide a virtual storefront via which customers 240 may select and order physical products 264 from a product provider 280 such as an online merchant. A virtual product 260 may be provided with at least some of the physical products 264 thus purchased as described herein.

FIG. 3 graphically illustrates distributing virtual products 260 to customers 240 in response to information about physical items provided by the customers 240, according to at least some embodiments. In some embodiments, a product provider 280 may provide virtual products 260 to customers 240 in response to item information 252 such as photographs of or other descriptive information for physical items presented to the product provider 280. The physical item 266 for which the item information 252 is provided may be, but is not necessarily, owned by or in the possession of the respective customer 240. The item information 252 provided for a physical item 266 to obtain a virtual product 260 may include one or more of, but is not limited to, one or more digital photographs of the physical item 266 or of packaging for the physical item 266, product names or numbers, scans of barcodes, UPC codes, or other product codes, or any other representation, documentation, or data that may identify and/or describe the physical item 266. As an example, a customer 240 may take digital photographs of one or more items 266 (e.g., tools, appliances, clothes, furniture, vehicles, etc.) at the customer's residence and submit the photographs to one or more product providers 280 to obtain virtual products 260 corresponding to the items 266. As another example, a customer 240 may take or otherwise obtain digital photographs of one or more items 266 at a friend's or relative's house, in a park, on the street, or in general at any public or private venue or site, and submit the photographs to a product provider 280 to obtain virtual products 260 corresponding to the items 266.

In some embodiments, for at least some products, actual purchase or ownership of the items 266 may be required to obtain corresponding virtual products 266. In these embodiments, at least some of the item information 252 provided by a customer 240 may provide evidence of purchase or ownership of the physical items 266 to the product provider 280. The actual physical items 266 may have been purchased from the product provider 280, may have been purchased from another online or brick-and-mortar vendor, or in some cases may have been otherwise obtained, for example purchased from private individuals. The evidence of purchase or ownership provided as item information 252 may include, but is not limited to, digital photographs of the physical items 266 in the customer's possession (e.g., at the customer's residence, office, etc.), electronic sales receipts, digital copies or photographs of sales receipts, product and serial numbers, scans of barcodes, UPC codes, or other scannable or otherwise readable product codes, and/or digital representations of any other documentation or data that may indicate purchase or ownership of a physical item 266. Using this method, a product provider such as an online merchant may obtain information about when, where, and how customers have purchased physical products that they own, what they paid for the products, what options or accessories they purchased with or use with the physical products, what other products they purchased with or use with the products, or in general any information that can be obtained from the provided evidence of purchase or ownership such as sales receipts, photographs, and so on.

The item information 252 may, for example, be provided to the product provider 280 via one or more digital channels. For example, the item information 252 may be emailed to the provider 280, uploaded to a website of the provider 280, or otherwise digitally transmitted to the provider 280. As an example, a product provider 280 may provide an application or service via which a customer 240 may submit or upload item information including but not limited to digital photographs to the product provider 280. In some embodiments, the item information 252 may be collected by a third party such as an online merchant or an application 200 provider and forwarded to a provider 280 that actually provides the virtual product 260.

While digital channels may generally be used to provide the item information 252 to a provider 280, in some implementations physical channels may instead or in addition be used. For example, in some implementations, a customer 240 may send an original or photocopy of a receipt for an item 266 and/or an actual photograph of the item 266 in an envelope through the mail to the provider 280 to obtain a virtual product 260 representing the item 266 for use in applications 200.

In some implementations, a provider 280 may perform at least some verification of the item information 252 provided by a customer 240 before providing a virtual product 260 to the customer. For example, if the customer 240 provides a digital image of an item 266 as evidence of ownership, metadata stored with the image may be checked, for example to determine if a GPS tag on the image corresponds to an address of the customer 240. However, in some implementations, a provider 280 may simply trust the customers 280 and provide virtual products 260 without significant verification of the item information 252, or may build or establish trust in particular customers 280 over time so that their item information 252 is not verified when submitted.

The digital representations of physical items 266 that are provided to customers 240 as virtual products 260 may generally represent the actual item 266. However, in some cases, a virtual product 260 may not be an exact image or model of the actual item 266. For example, the virtual product 260 may be a representation of a physical item 266 that is similar to but not the exact physical item 266 that the customer 240 actually owns.

In at least some embodiments, item information 252 provided by customers 240 may be collected, stored, and analyzed. Using this method, a product provider 280 such as an online merchant may obtain, from the item information 252, data about when, where, and how customers 240 have purchased physical items 266, what they paid for the items 266, what options or accessories they purchased with or use with the physical items 266, what other products they may have purchased with or may use with the items 266, or in general any information that can be obtained from the provided item information 252 including but not limited to evidence of purchase or ownership such as sales receipts, photographs, and so on. This data may be collected, analyzed, and applied in one or more areas of real-world production and marketing, including but not limited to targeted advertising and direct marketing.

In at least some embodiments, instead or in addition to providing virtual products 260 based on provided item information 252 including but not limited to evidence of purchase or ownership of items 266, virtual products 260 may be provided by a product provider 280 to customers 240 based on item information 252 including but not limited to previous purchase information obtained from other sources than the customers 240. For example, an online merchant may review previous sales records that it maintains (or obtains from other sources such as other vendors) and provide or offer virtual products 260 to at least some customers 240 based on their previous purchases of physical items 266.

While FIG. 3 shows customers 240 submitting item information 252 directly to product providers 280, in some embodiments at least some item information 252 may be submitted to a product provider 280 via an interface provided to the customers 240 by an application 200. For example, an application 200 such as an online game may provide a virtual kiosk or the like via which customers 240 may submit item information 252 including but not limited to evidence of physical items 266 that they own to obtain virtual products 260 from product providers 280.

FIG. 4 graphically illustrates distributing virtual products 260 and physical objects 268 to customers in response to design information received from a customer 280, according to at least some embodiments. In at least some embodiments, a virtual product 260 may be provided by a product provider 280 in response to a customer 240 providing a design or specification 254 for a physical object 268 and purchasing the production of at least one instance of the physical object 268 from the provider 280 based on the specification 254. As an example, a product provider 280 may provide a "print on demand" service whereby 3D printing technology may be used to print physical objects 268 based on input designs or specifications 254. A customer 240 may, for example, use a design 206 interface provided by a game or other application 200 to design an object 268, submit the specification 254 to the product provider 280, and purchase an instance of the physical object 268 from the provider 280. The product provider 280 may, for example, use 3D printing technology (or other technology) to produce at least one physical instance of the object 268 based on the specification 254, and may also generate a digital representation of the object 268 to be provided to the customer 240 as a virtual product 260. The virtual object 260 may be provided to the customer 240 along with the physical object 268, and may be instantiated and used in various applications 200 as a VP instance 262.

As an example, an application 200 may be a game system that provides one or more graphical and/or textual design 206 interfaces via which players (e.g., customers 240) or other entities may design and modify objects. Via the design 206 interface, players may select, access, design, and/or modify models of objects. In some embodiments, the players may obtain instances of virtual objects corresponding to the designs for use within the game universe 204 by submitting specifications for the objects to a product provider and purchasing at least one instance of the actual physical object.

FIG. 5 graphically illustrates distributing virtual products through customers' digital lockers, according to at least some embodiments. In at least some embodiments, a digital locker service 242 may be provided in which digital lockers 244 may be established for and provided to customers 240. The digital locker service 242 may be an online service provided by a product provider 280 such as an online merchant as illustrated in FIG. 12, by an application 200 provider, or by some other online presence or entity. The digital locker service 242 may provide an interface such as an API via which product providers 280 may store virtual products 260 to customers' digital lockers 244. The digital locker service 242 may also provide an interface such as an API via which applications 200 may access 274 virtual products 260 in customers' digital lockers 244 to instantiate VP instances 262 in virtual universes 204. The digital locker service 242 may also provide an interface via which customers 240 may access 272 and manage their digital lockers 244 and the virtual products 260 stored therein. Note that other digital items than virtual products 260 may be stored in customers' digital lockers 244 in some embodiments.

In some embodiments, a customer 240 may have one digital locker 244 that may be used to store virtual products 260 for all applications 200 that may access virtual products 260 from the digital locker service 242. In some embodiments, however, a separate digital locker 244 may be provided to each customer 240 for each application 200. In some embodiments, a digital locker 244 may be shared or accessed by two or more customers 240. For example, a family or gaming group may share a digital locker 244.

FIG. 6 is a flowchart of a method for distributing virtual products to customers with purchased physical products, according to at least some embodiments. As indicated at 600, purchase information for physical products may be obtained from customers. For example, a customer may provide purchase information to a product provider (e.g., an online merchant as illustrated in FIG. 12) via a web site, web application, mobile application, or other interface to search for, locate, and purchase one or more physical products offered for sale by the product provider.

Figure 14:
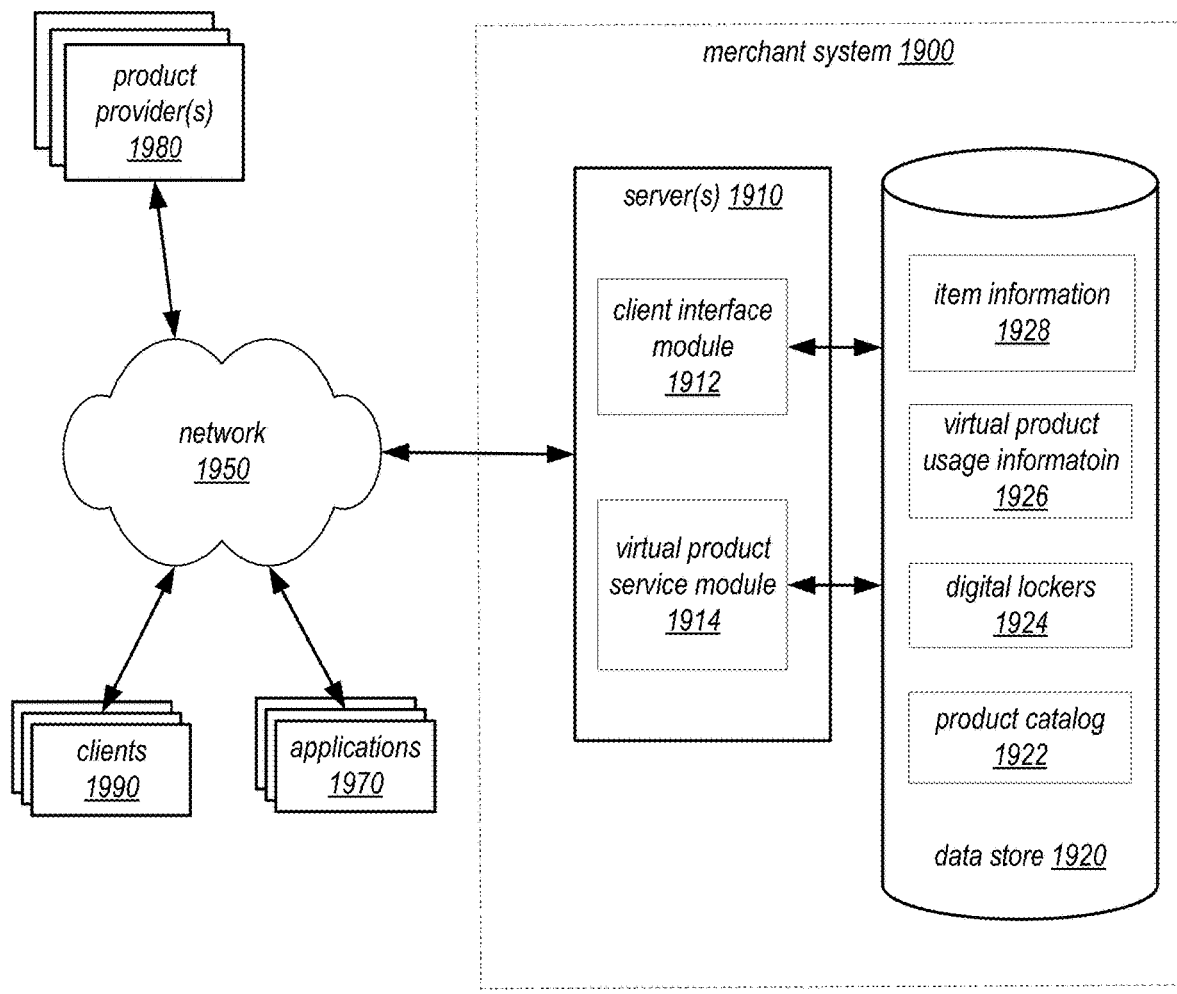
FIG. 14 illustrates an example network environment in which a merchant system may implement virtual product services, according to at least some embodiments.

In some implementations, a product provider such as an online merchant may provide an item details page or item page for at least some of the physical products offered by the product provider, for example via a client interface module 1312 as illustrated in FIG. 14. When a customer navigates to an item page on an online merchant's website, information for the product may be displayed to the page, for example vendor- or manufacturer-supplied descriptions, images, pricing information, availability information, product numbers, purchasing or ordering information, and so on. The item page may also include various user interface elements such as menus, buttons, tabs, scroll bars, hot links, and so on, that may be used for navigation (e.g., go to another page), page control (e.g., scroll down), purchasing, or various other purposes. The customer may interact with the user interface elements of the item page, for example using a cursor control device such as a mouse and a keyboard or, on a touch-enabled device, touch gestures input to a touch screen. In at least some embodiments, the item page may include an indication that a virtual product (e.g., a 2D or 3D model of the physical product) is made available to the customer with the purchase of the physical product.

In some embodiments, at least some purchases may be made via an interface provided to the customers by an application such as an online game system. For example, an application such as an online game may provide a virtual storefront via which customers may select and order physical products from a product provider.

As indicated at 602 of FIG. 6, the purchased physical products may be mapped to digital representations of the products. For example, a product provider such as an online merchant may maintain a product catalog that includes data for the physical products, for example names and descriptions of the products, prices and availability of the products, and so on. This product data may, for example, be displayed on item pages as described above. The product catalog may also include 2D or 3D graphical representations, models, or images for at least some of the physical products offered for sale by the product provider that may be used as digital representations of the products. When a customer purchases a particular physical product, the product may be mapped to a digital representation for the product in the catalog. These digital representations may be used as virtual products as described herein. In some embodiments, instead of or in addition to obtaining digital representations from a catalog, digital representations may be obtained from product manufacturers, distributors, or other entities, or may be generated, for example by 2D or 3D scanning or imaging of examples of the products.

As indicated at 604 of FIG. 6, virtual products may be provided to the customers along with at least some of the physical products that the customers purchase from the product provider. The virtual products may be used in various applications, including but not limited to online games and social media applications. Offering a virtual product with the purchase of a physical product may, for example, provide incentive for some customers to purchase the particular physical products.

In some embodiments, the virtual products may be provided directly to one or more application(s) to be rendered as virtual product (VP) instances for respective customers. In some embodiments, the virtual products may instead or in addition be provided directly to the customers. The customers may then provide the virtual products to one or more applications to be rendered as VP instances for the respective customers. In some embodiments, the virtual products may be stored in digital lockers associated with the customers, and may be accessed from the lockers by the customers and/or by the applications to be rendered as VP instances.

FIG. 7 is a flowchart of a method for distributing virtual products to customers in response to item information provided by the customers, according to at least some embodiments. In at least some embodiments, a product provider (e.g., an online merchant as illustrated in FIG. 12) may provide virtual products to customers in response to item information such as photographs of or other descriptive information for physical items presented to the product provider. The physical item for which the item information is provided may be, but is not necessarily, owned by or in the possession of the respective customer. In some embodiments, for at least some products, actual purchase or ownership of the products may be required to obtain corresponding virtual products. In these embodiments, at least some of the item information provided by a customer may provide evidence of purchase or ownership of the physical items to the product provider. The actual physical items may have been purchased from the product provider, may have been purchased from another online or brick-and-mortar vendor, or in some cases may have been otherwise obtained, for example purchased from private individuals.

As indicated at 700 of FIG. 7, item information may be obtained from customers. The item information may include one or more of, but is not limited to, one or more digital photographs of the physical item or of packaging for the physical item, product names or numbers, scans of barcodes, UPC codes, or other product codes, or any other representation, documentation or data that may identify and/or describe the physical item. Item information presented as evidence of purchase or ownership may include, but is not limited to, digital photographs of the physical items in the customer's possession, digital copies or photographs of sales receipts, or in general any other documentation or data that may indicate purchase or ownership of a physical item. The item information may, for example, be provided to the product provider via one or more digital channels in various embodiments. For example, the item information may be emailed, uploaded to a website of the provider, or otherwise digitally or electronically entered or provided to the provider. As an example, a product provider may provide an application or service via which a customer may submit or upload item information including but not limited to digital photographs to the product provider. In some embodiments, in submitting the item information for a given product, the customer may be prompted to enter or otherwise provide information for the product such as product name, manufacturer, model number, serial number, price, data of purchase, source of purchase, location, general description, and so on. At least some of the information submitted by a customer as item information may be required; however, some of the information may be optionally provided.

In some implementations, a product provider such as an online merchant may provide an interface (e.g., a web page, email address, etc.) via which customers can submit item information including but not limited to evidence of ownership of products. As just one example, in some implementations, a product provider such as an online merchant may provide an item page for at least some of the physical products offered by the product provider, for example as described above in reference to FIG. 6. The item page for a product may include an indication that a virtual product is made available to the customer with proof of purchase of the physical product. The item page may include one or more "submit ownership evidence" user interface elements or the like for the product via which a customer may submit digital photos, receipts, and/or other information to establish that the user is in possession of at least one instance of the physical product advertised on the page.

In some embodiments, at least some item information may be submitted to a product provider via an interface provided to the customers by an application such as an online game system. For example, an application such as an online game may provide a virtual kiosk or the like via which customers may submit item information including but not limited to evidence of physical items that they own to a product provider.

In some embodiments, for at least some products, actual purchase or ownership of the products may be required to obtain corresponding virtual products. In these embodiments, at least some of the item information provided by a customer may be submitted as evidence of purchase or ownership of a product. In some embodiments, the provided evidence of purchase or ownership may optionally be verified to determine, within some level of confidence, that the respective customers actually have purchased or own the respective products. For example, if a customer provides a digital image of an item as evidence of ownership, metadata stored with the image may be checked, for example to determine if a GPS tag on the image corresponds to an address of the customer. However, in some implementations, a provider may simply trust the customers and provide virtual products without verification of the submitted evidence of purchase or ownership, or may build or establish trust in particular customers over time so that their evidence purchase or of ownership is not necessarily verified when submitted.

As indicated at 702 of FIG. 7, the item information obtained from the customers may be mapped to digital representations of physical products. For example, a product provider such as an online merchant may maintain a product catalog that includes data for the physical products, for example names and descriptions of the products, prices and availability of the products, and so on. The product catalog may also include 2D or 3D graphical representations, models, or images for at least some of the physical products offered for sale by the product provider that may be used as digital representations of the products. When a customer provides item information describing or identifying a physical item, the item information may be mapped to a digital representation in the catalog. For example, a product name, description, image, and/or product number provided by the customer may be mapped to a product listing in the catalog that indicates or includes the digital representation. These digital representations may be used as virtual products as described herein.

In some embodiments, instead of or in addition to obtaining digital representations from a product catalog, digital representations may be obtained from other sources such as product manufacturers or distributors. In some embodiments, at least some of the digital representations provided to customers in response to item information provided by the customers may be generated by the product provider using one or more techniques, for example by 2D or 3D scanning or imaging of examples of the products indicated by the item information or of similar products, or by generating 2D or 3D models as digital representations of items based on descriptive information including but not limited to digital images provided by the customer. In some embodiments, digital representations may be identified by finding best matches for provided digital images of items in an image database using digital image matching technology; the physical items or similar items may be identified according to the located best matches, and digital representations of the identified items may be obtained or generated accordingly. Note that other methods than those described may be used to generate or obtain digital representations of physical items in various embodiments.

The digital representations of the physical products to which the item information is mapped may represent the actual items for which the customers provide the item information. However, in some cases, a digital representation provided as a virtual product may not be an exact image or model of the actual product. For example, in some cases, a digital representation of the exact item may not be available. Thus, in some cases, a digital representation that is similar to the product for which the item information is presented may be located or generated and used as a virtual product. As examples, the virtual product may be a digital representation of a physical item that is similar to but not the exact physical item, or a generic representation of a type of product or item rather than an accurate depiction of an actual product or item. As another example, brand or product names, trademarks, or other identifying marks may be obscured or removed from the digital representations of at least some products that are provided to customers.

As indicated at 704 of FIG. 7, the virtual products may be provided to the respective customers for use in various applications such as online games or social media sites. In some embodiments, the virtual products may be provided directly to one or more application(s) to be rendered as virtual product (VP) instances for respective customers. In some embodiments, the virtual products may instead or in addition be provided directly to the customers. The customers may then provide the virtual products to one or more applications to be rendered as VP instances for the respective customers. In some embodiments, the virtual products may be stored in digital lockers associated with the customers, and may be accessed from the lockers by the customers and/or by the applications to be rendered as VP instances.

As indicated at 706 of FIG. 7, the item information may be recorded. In at least some embodiments, the item information provided by the customers may be collected, stored, and analyzed. Using this method, a product provider such as an online merchant may obtain, from the item information, data including one or more of, but not limited to, when, where, how, and from whom customers have purchased physical items, what they paid for the items, what options or accessories were purchased with or are used with the physical items, what other products they may have purchased with or may use with the items, or in general any information that can be obtained from the provided item information including but not limited to evidence of purchase or ownership such as sales receipts, photographs, and so on. This data may be collected, analyzed, and applied in one or more areas of real-world production and marketing, including but not limited to targeted advertising and direct marketing.

As a non-limiting example, referring to FIG. 12, online merchant 1270 may collect and store item information 1252 received from one or more customers 1240. A data analysis 1278 component of the online merchant 1270 may analyze at least a portion of item information 1252 using one or more data analysis techniques to generate analysis results 1279. The analysis results 1279 may be used by the online merchant 1270 and/or may be provided to one or more product providers 1280. Alternatively, a product provider 1280 may obtain at least a portion of item information 1252 from online merchant 1270 and may perform its own analysis. The following describes a few non-limiting examples as to how the collected item information 1252 may be applied in one or more areas of real-world production and marketing.

As an example use case for the collected item information 1252, a product provider 1280 or online merchant 1270 may evaluate item information 1252 to determine competitive pricing information for one or more physical products. For example, a product provider 1280 may determine from sales receipts provided by one or more customers 1240 the prices at which other vendors are selling a particular physical product, and may base pricing decisions at least in part on this information.

As another example use case, a product provider 1280 or online merchant 1270 may evaluate item information 1252 to determine what options or accessories tend to be purchased with or used with particular physical items, or to determine what other products customers tend to purchase with or use with particular physical items. This information may, for example, be used in targeted advertising or cross-merchandising of products. For example, a product provider such as an online merchant 1270 may provide an item page for at least some of the physical products offered by the online merchant 1270. When a customer navigates to an item page for a particular product, suggestions of accessories, options, or other products that the customer may be interested in may be displayed based at least in part on the evaluation of the item information 1252.

As another example use case, the item information 1252 may be evaluated in light of information including but not limited to customers' locality and demographic information and used in targeted advertising or marketing for certain physical products. For example, the information may be evaluated to determine that customers in certain geographic regions or of certain demographics are more likely to use certain physical products, certain accessories for physical products, certain combinations of physical products, and so on, and these groupings of customers may be targeted with advertising for particular physical products based at least in part on the evaluation of the item information 1252.

FIG. 8 is a flowchart of a method for distributing virtual products and physical products to customers in response to customer design information, according to at least some embodiments. In at least some embodiments, a virtual product may be provided by a product provider in response to a customer providing a design or specification for a physical object and purchasing the production of at least one instance of the physical object from the provider based on the specification.

As indicated at 800 of FIG. 8, item design information may be obtained from a customer. For example, a customer may use a design interface provided by an application such as an online game system to generate a design for an object, and may submit a specification for the object to a product provider via an interface provided by the product provider. As an example, a product provider may provide a "print on demand" service whereby 3D printing technology may be used to print physical objects based on input designs or specifications.

As indicated at 802 of FIG. 8, a physical instance of an item may be produced according to the design. As an example, the product provider may use 3D printing technology (or other technology) to produce at least one physical instance of the object based on the specification.

As indicated at 804 of FIG. 8, a digital representation of the item may be generated. The product provider may, for example, generate a 2D or 3D digital representation or model of the object based on the specification provided by the customer in addition to the physical object. As another example, the product provider may photograph or scan the physical object once produced to generate a 2D or 3D image of the object.

As indicated at 806 of FIG. 8, the digital representation of the object may be provided to the customer as a virtual product along with the physical object. In some embodiments, the virtual product may be provided directly to one or more application(s) to be rendered as a virtual product (VP) instance for the customer. In some embodiments, the virtual product may instead or in addition be provided directly to the customer. The customer may then provide the virtual product to one or more applications to be rendered as a VP instance. In some embodiments, the virtual product may be stored in a digital locker associated with the customer, and may be accessed from the locker by the customer and/or by an application to be rendered as a VP instance.

As an example, referring to FIG. 12, an application 1200 may be a game system that provides a graphical and/or textual design interface as a client interface 1222 via which players (e.g., customers 1240) or other entities may design and modify objects within the game system. Via the design interface, players may select, access, design, and/or modify models of objects. In some embodiments, the players may obtain instances of virtual objects or products 1260 corresponding to the designs for use within the game universe 1204 as VP instances 1262 by submitting specifications for the objects to a product provider such as online merchant 1270 and purchasing at least one instance of the actual physical object. The physical object may, for example, be generated using 3D printing technology.

Figure 9:
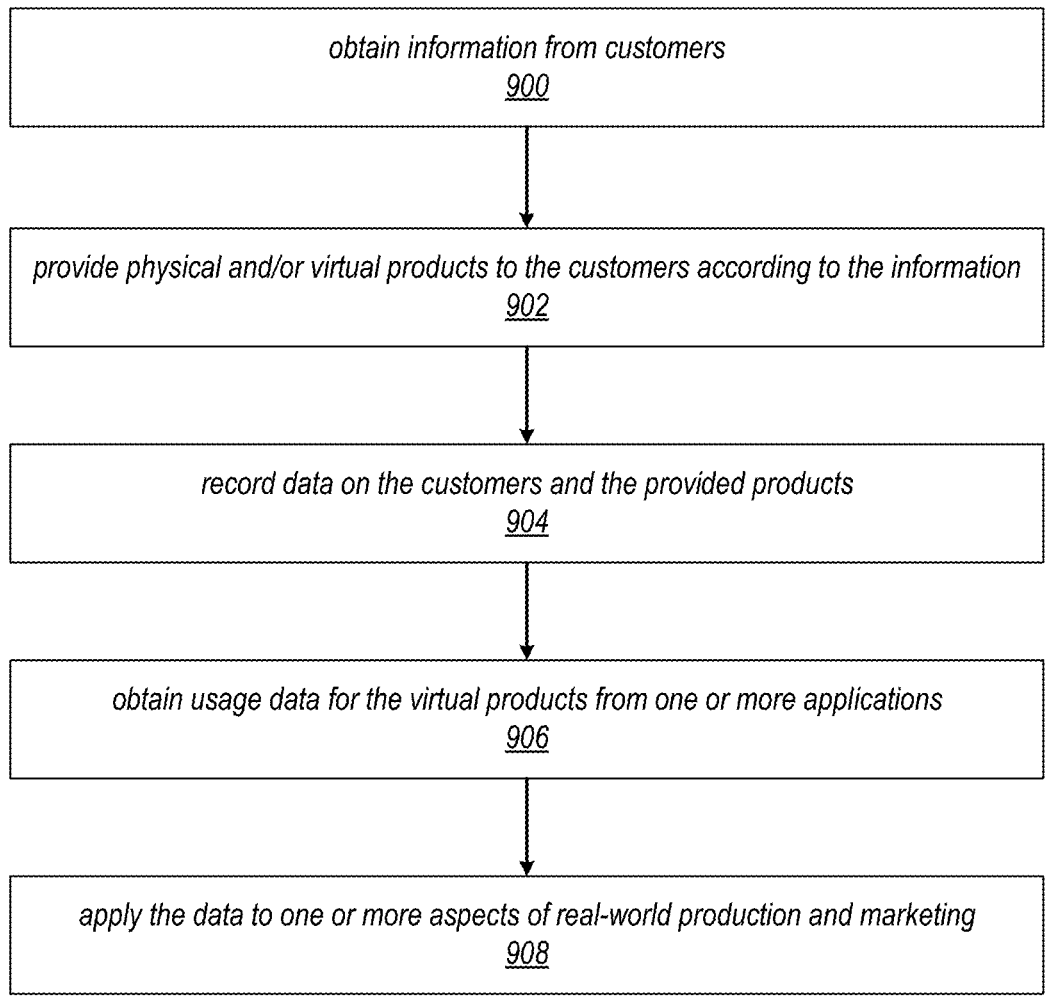
FIG. 9 is a flowchart of a method for obtaining and applying virtual product usage data to real-world production or marketing, according to at least some embodiments.

FIG. 9 is a flowchart of a method for obtaining and applying virtual product usage data to aspects of real-world production and marketing, according to at least some embodiments. In embodiments, various product providers (e.g., manufacturers, producers, vendors, merchants, etc.) may provide digital representations of physical products as virtual products to customers. The customers may use the virtual products in various applications, for example online, multiplayer game systems and social media applications. Usage of the virtual products in the applications may be monitored, and usage information for the virtual products may be collected and analyzed. The usage information may, for example, be applied in one or more areas of real-world production and marketing such as product design, manufacturing, distribution, advertising, and so on.

As indicated at 900 of FIG. 9, product-related information may be obtained from customers. The information may include one or more of, but is not limited to, product purchase information as described in reference to FIGS. 2 and 6, item information as described in reference to FIGS. 3 and 7, and product specifications or designs as described in reference to FIGS. 4 and 8.

As indicated at 902 of FIG. 9, physical and/or virtual products may be provided to the customers according to the obtained information. For example, virtual products may be provided to customers of a product provider that also purchase the physical products from the product provider as described in reference to FIGS. 2 and 6. As another example, virtual products may be provided to customers of a product provider that provide item information including but not limited to evidence of purchase or ownership of the physical products to the product provider as described in reference to FIGS. 3 and 7. As another example, virtual products may be provided to customers of a product provider that submit a product specification for an object and purchase at least one instance of the object from the product provider as described in reference to FIGS. 4 and 8.

As indicated at 904 of FIG. 9, data concerning the customers and the provided physical and/or virtual products may be recorded. For example, product purchase information as described in reference to FIGS. 2 and 6 may be recorded. As another example, item information as described in reference to FIGS. 3 and 7 may be recorded. As another example, product specifications or designs, as well as purchase information, as described in reference to FIGS. 4 and 8 may be recorded. In addition, information on the provided virtual products may be recorded, for example information mapping particular virtual products to particular customers and/or to particular applications to which the virtual products were provided may be recorded.

As indicated at 906 of FIG. 9, usage data for the virtual products may be obtained from one or more applications in which the virtual products are instantiated. Referring to FIG. 12, customers 1240 may manage, manipulate, or otherwise use their VP instances 1262 in application systems 1200 via user input/output 1270 to interfaces provided by the application systems 1200. In at least some embodiments, an application 1200 in which the virtual products 1260 are used may include a monitoring and data collection 1210 component or module that monitors virtual product 1260 use in the application 1200, collects usage data 1290 for the virtual products 1290, and provides the usage data 1290 to one or more product providers 1280 and/or to an online merchant 1270. In at least some embodiments, application programming interfaces (APIs) may be provided by applications 1200 and/or product providers 1280 via which application 1200 developers (e.g., game developers) and product providers 1280 including online merchants 1270 may establish interfaces, communications channels and protocols for communicating virtual product-related information including but not limited to the collected usage information 1290. Note that one, two, or more applications 1200 may collect usage data 1290 and provide the usage data to one or more of the product providers 1280 and/or to the online merchant 1270.

In some embodiments, the usage information that is collected for the virtual products 1260 by an application 1200 and that is provided to the product providers 1280 and/or to the online merchant 1270 may include preference information for virtual products 1260 within the application 1200. For example, the preference information collected within a game or social media application may indicate which virtual products 1260 are used most within the application 1200, which modifications to virtual products 1260 are popular within the application 1200, which combinations of virtual products 1260 are used within the application 1200, what options or accessories are popular for the virtual products 1260 within the application 1200, and so on.

Another example of usage information that may be collected for the virtual products 1260 by an application 1200 and that may be provided to the product providers 1280 and/or to the online merchant 1270 is customer rating or comment information. For example, an application 1200 may provide an interface via which customers 1240 can rate or comment on the virtual products 1260 that they use in the application 1200, or via which customers 1240 can rate or comment on VP instances 1262 that they see used by others in the application 1200. This information may be collected and provided to one or more external entities such as product providers 1280 or online merchant 1270.

In some embodiments, the usage information that is collected for the virtual products 1260 by an application 1200 and that is provided to the product providers 1280 and/or to the online merchant 1270 may instead or in addition include performance information related to how the virtual products 1260 perform in the virtual universe 1204 of the application 1200. For example, in a game universe, a game engine may be used to simulate real-world performance for virtual products used within the universe, and virtual performance data may be collected for the products. For example, in an online, multiplayer racing game system, different cars and/or accessories such as tires may be provided as virtual products, and performance data may be collected for the virtual products within the game universe according to physics models applied by the game engine to the virtual products.

As indicated at 908 of FIG. 9, the virtual product usage data may be applied to one or more aspects of real-world production and marketing such as product design, manufacturing, distribution, advertising, and so on. As a non-limiting example, referring to FIG. 12, online merchant 1270 may receive virtual product usage information 1290 from one or more applications 1200. A data analysis 1278 component of the online merchant 1270 may analyze at least virtual product usage information 1290 using one or more data analysis techniques to generate analysis results 1279. Note that the data analysis 1278 component may be a component of the virtual product service module(s) 1274. The analysis results 1279 may be used by the online merchant 1270 and/or may be provided to one or more product providers 1280. Alternatively, a product provider 1280 may receive virtual product usage information 1290 from one or more applications 1200 and may perform its own analysis of the information 1290. The following describes several non-limiting examples as to how the virtual product usage data may be applied to various aspects of real-world production and marketing such as product design, manufacturing, distribution, advertising, and so on.

In some implementations, a product provider 1280 may use the virtual product usage information 1290 collected from one or more applications 1200 in making design decisions for at least some physical products. For example, as described above, in some embodiments, the usage information 1290 that is collected for the virtual products 1260 by an application 1200 and that is provided to the product providers 1280 and/or to the online merchant 1270 may include performance information related to how the virtual products 1260 perform in the virtual universe 1204 of the application 1200. In at least some embodiments, a product manufacturer may make actual design or modification decisions for physical products to be produced based at least in part on the performance information obtained for virtual product usage in one or more applications 1200. As another example, the information 1290 that is collected for the virtual products 1260 may include customer comments that may mention problems with or make suggestions for improving particular virtual products. These comments may be evaluated to determine if there are suggestions that may be applied to improve a particular physical product.

A product provider 1280 may, for example, use the virtual product usage information 1290 collected from one or more applications 1200 in making various production, manufacturing, and distribution decisions for physical products. For example, a product provider 1280 may evaluate virtual product usage information 1290 to determine popularity of and trends for particular virtual products within various applications including but not limited to social media applications and online game systems, and possibly to make predictions of future demand. At least in part based on this evaluation, the product provider 1280 may decide to produce more or fewer instances of particular physical products. Similarly, the virtual product usage information 1290 may be evaluated to determine popularity of particular models, modifications, colors, accessories, options, and so on for the virtual products. Production decisions for physical products may be made at least in part based on this evaluation. As another example, the virtual product usage information 1290 may be evaluated in light of other customer information and used in making distribution decisions for certain physical products. For example, the information may be evaluated to determine the locations of customers 1240 that are most likely to use certain virtual products in the applications. This locality information may be analyzed and used in decisions on where to distribute certain physical products.

A product provider 1280 may, for example, use the virtual product usage information 1290 collected from one or more applications 1200 in marketing or advertising particular physical products and/or virtual products. The following are several non-limiting examples.

In some implementations, a product provider such as an online merchant 1270 may provide an item details page or item page for at least some of the physical products offered by the online merchant 1270. When a customer 1240 navigates to an item page on the online merchant's website, information for the product may be displayed to the page, for example vendor- or manufacturer-supplied descriptions, images, pricing information, availability information, product numbers, purchasing or ordering information, and so on. In at least some embodiments, advertising information for the product based on the virtual product usage information for the product may be displayed on the item page. As a non-limiting example, a banner may be placed on the item page that indicates that the product is popular among players of a given game, or among members of a particular social media group, and so on. Advertising information for products based on virtual product usage information for the products may be used on other web pages and in other marketing or advertising channels as well, for example in emails to selected customers 1240 or banner ads on other websites. In addition, the information may be used in advertising for the virtual products on the online merchant's website or via other channels.

As another example, in at least some embodiments of an online merchant 1270, an item page for a product may include a customer ratings and information section that may, for example, include an overall average customer rating for the item (e.g., based on a number of "stars" or other metric that purchasers may rate items with) and/or customer comments on the item. In some embodiments, customer ratings for and/or comments about virtual products used within applications 1200 that are received as part of the virtual product usage information 1290 collected from one or more applications 1200 may be used in or integrated with the customer ratings and information section of the item pages for the physical products. The customer ratings and/or comments of virtual products may be used in other marketing or advertising channels as well.

As another example, the virtual product usage information 1290 collected from one or more applications 1200 may be analyzed to determine which accessories or options are used with particular virtual products 1260 by customers 1240, what modifications were made to particular virtual products 1260 by customers 1240, which virtual products 1260 tend to be used in combination by customers 1240, and other information regarding the relationships of different virtual products 1260 as used by customers 1240 within the applications 1240. An online merchant 1270 or other product provider 1280 may use this information, for example on an item page or via other advertising channels, to recommend accessories, options, modifications, and/or other products to customers 1240 for physical products and/or virtual products 1260 based on the virtual product usage information.

As another example, the virtual product usage information 1290 may be evaluated in light of other information including but not limited to customers' locality and demographic information and used in targeted advertising or marketing for certain physical and/or virtual products. For example, the information may be evaluated to determine that customers in certain geographic regions or of certain demographics are more likely to use certain virtual products within the applications, and these groupings of customers may be targeted with advertising for related physical products or virtual products.

Figure 10:
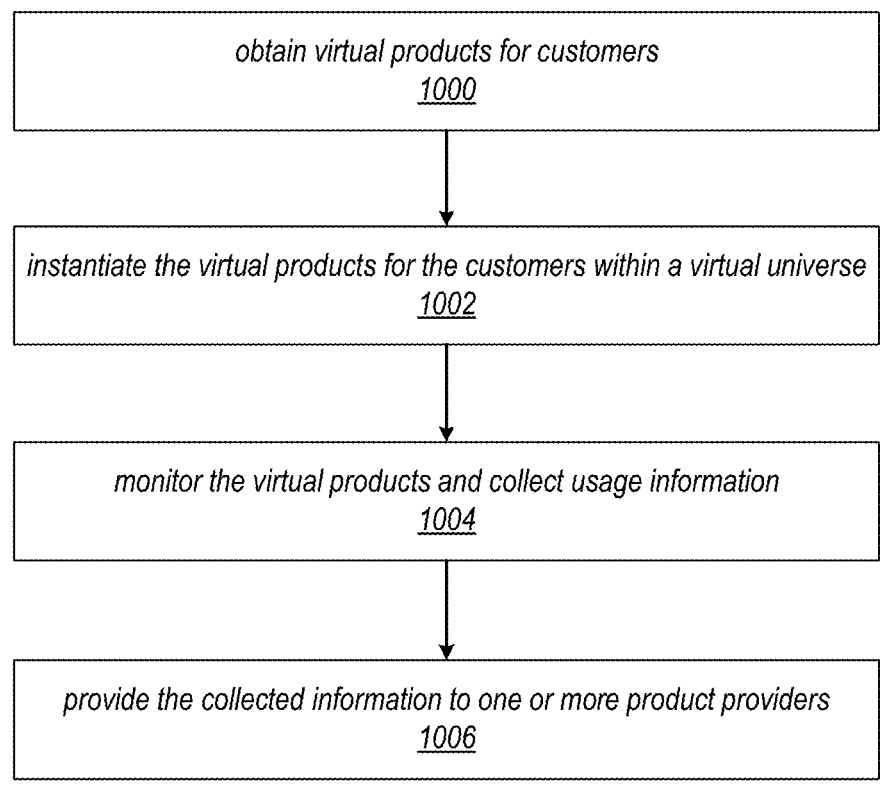
FIG. 10 is a flowchart of a method for collecting and providing virtual product usage data, according to at least some embodiments.

FIG. 10 is a flowchart of a method for collecting and providing virtual product usage data, according to at least some embodiments. The method of FIG. 10 may, for example, be implemented by an application system 1200 as illustrated in FIG. 12.

As indicated at 1000 of FIG. 10, an application system 1200 may obtain virtual products 1260 for one or more customers 1240. While FIG. 12 shows virtual products 1260 being provided directly from an online merchant 1270 to an application 1200 to be rendered as VP instances 1262 for customers 1240, in some embodiments virtual products 1260 may instead or in addition be provided directly to the customers 1240. The customers 1240 may then provide the virtual products 1260 to one or more applications 1200 to be rendered as VP instances 1262. In some embodiments virtual products 1260 may be stored in digital lockers 1242 associated with the customers 1240, and may be accessed from the lockers 1242 by the customers 1240 and/or by the application 1200.

As indicated at 1002 of FIG. 10, the virtual products 1260 may be instantiated for the customers 1240 within a virtual universe 1204 of the application 1200 as VP instances 1262. VP instances 1262 represent particular instances of virtual products 1260 that are rendered within a virtual universe 1204 of an application 1200. Generally, each VP instance 1262 may be associated with or owned by a particular customer 1240 that participates in the virtual universe 1204 of the application 1200. For example, a VP instance 1262 may be a graphical representation of a particular article of apparel or accessory that the customer 1240 has purchased and that is rendered on an avatar that the customer 1240 uses in the virtual universe 1204 of a social media application or game application. As another example, a VP instance maybe a complex 2D or 3D model of a product that the customer 1240 has purchased and that is rendered within a game universe 2204 of a multiplayer game system.

As indicated at 1004 of FIG. 10, the virtual products 1260 within the universe 1204 of the application 1200 may be monitored, and usage information for the virtual products may be collected. As indicated at 1006 of FIG. 10, the collected information may be provided to one or more product providers. In at least some embodiments, the application system 1200 may include a monitoring and data collection 1210 component or module that monitors virtual product 1260 use in the application 1200, collects usage data

1290 for the virtual products 1290, and provides the usage data 1290 to one or more product providers 1280 and/or to an online merchant 1270. In at least some embodiments, application programming interfaces (APIs) may be provided by the application 1200 and/or by the product providers 1280 via which the application 1200 developers (e.g., game developers) and product providers 1280 may establish interfaces, communications channels and protocols for communicating virtual product-related information including but not limited to the collected usage information 1290.

In some embodiments, one, two, or more applications 1200 may collect usage data 1290 and provide the usage data to one or more of the product providers 1280 and/or to the online merchant 1270. In some embodiments, an application 1200 may provide particular usage information 1290 to particular providers 1280. For example, two or more providers may be associated with different virtual products 1260 used in an application 1200, and the application 1200 may only provide information 1290 to a product provider 1280 for the virtual products 1260 that it is associated with.

Figure 11:
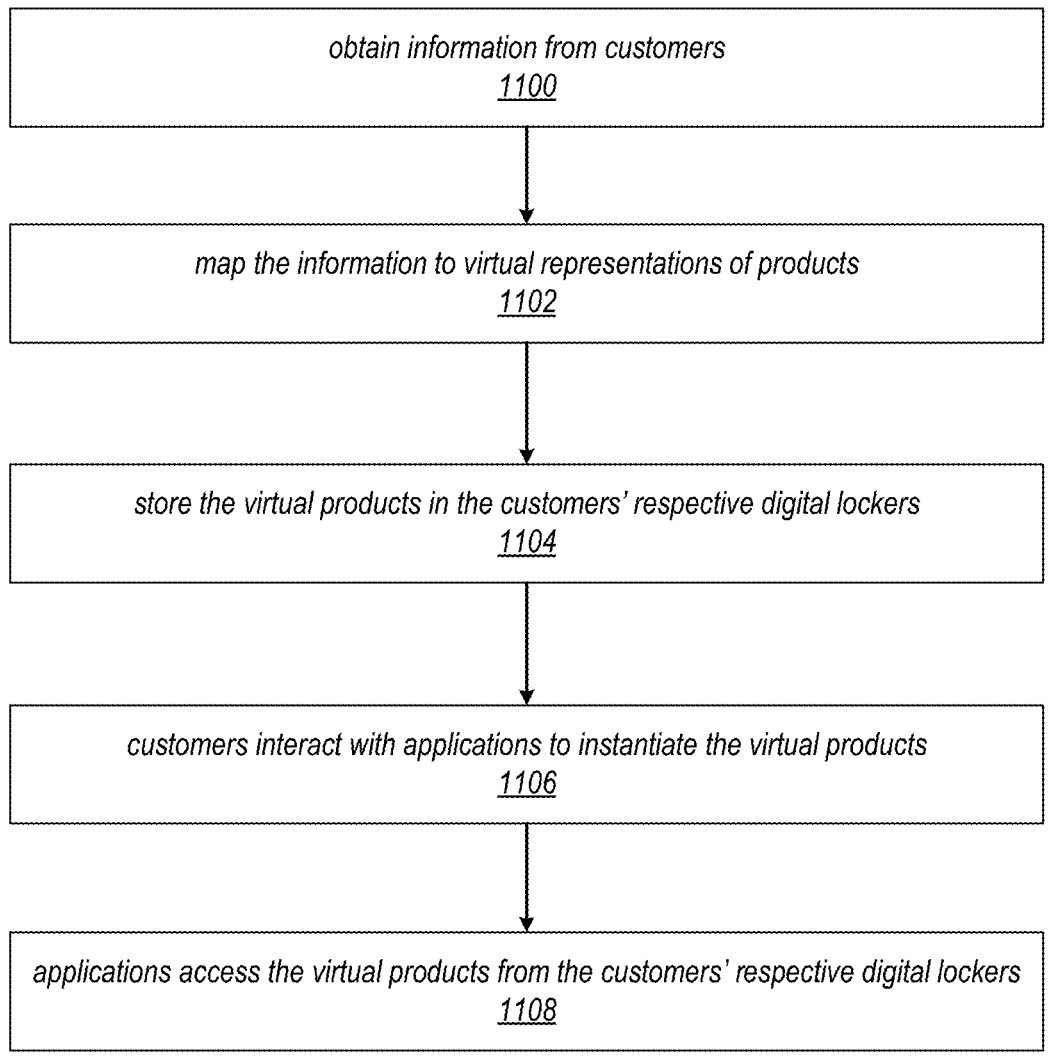
FIG. 11 is a flowchart of a method for distributing virtual products through customers' digital lockers, according to at least some embodiments.

FIG. 11 is a flowchart of a method for distributing virtual products through customers' digital lockers, according to at least some embodiments. As shown in FIG. 5, in some embodiments virtual products may be stored in digital lockers associated with the customers, and may be accessed from the lockers by the customers and/or by applications such as online game systems in which the virtual products are to be instantiated and used.

As indicated at 1100 of FIG. 11, product-related information may be obtained from customers. The information may include one or more of, but is not limited to, product purchase information as described in reference to FIGS. 2 and 6, item information as described in reference to FIGS. 3 and 7, and product specifications or designs as described in reference to FIGS. 4 and 8.

As indicated at 1102 of FIG. 11, the information obtained from the customers may be mapped to digital representations of products. For example, a product provider such as an online merchant may maintain a product catalog that includes data for the physical products, for example names and descriptions of the products, prices and availability of the products, and so on. The product catalog may also include 2D or 3D graphical representations, models, or images for at least some of the physical products offered for sale by the product provider that may be used as digital representations of the products. Product-related information obtained from a customer may be mapped to a digital representation in the catalog. For example, a product name, description, image, and/or product number provided by the customer may be matched to a product listing in the catalog that indicates or includes the digital representation. These digital representations may be used as virtual products as described herein.

As indicated at 1104 of FIG. 11, the virtual products may be stored in the customers' respective digital lockers. In at least some embodiments, a digital locker service may be provided in which digital lockers may be established for and provided to customers. The digital locker service may be an online service provided by a product provider such as an online merchant as illustrated in FIG. 12, by an application provider, or by some other online presence or entity. The digital locker service may provide an interface such as an API via which product providers may store virtual products to customers' digital lockers.

As indicated at 1106 of FIG. 11, the customers may interact with applications to instantiate the virtual products. In some embodiments, a digital locker service may provide an interface via which customers may access and manage their digital lockers and the virtual products stored therein. In some embodiments, an application may also provide an interface via which a customer can request that the application load one or more virtual products from a specified digital locker. As indicated at 1108 of FIG. 11, the applications may access the virtual products from the customers' respective digital lockers. In at least some embodiments, a digital locker service may provide an interface such as an API via which applications may access virtual products in customers' digital lockers to instantiate virtual product (VP) instances within the virtual universes rendered by the applications, for example within the game universe of a game application.

In at least some embodiments, an application, via one or more APIs, may control, filter, or limit which virtual products and/or how many virtual products may be imported into the application by the customers from the digital lockers. For example, a particular application may not allow certain types of virtual objects into a game universe, and thus may not allow customers to load those types of virtual objects into the universe.

In some embodiments, a customer may have one digital locker that may be used to store virtual products for all applications that may access virtual products from the digital locker service. In some embodiments, however, a separate digital locker may be provided to each customer for each application, or for groups or types of applications. Note that other digital items than virtual products may be stored in customers' digital lockers in some embodiments.

In some embodiments, an application may provide one or more digital lockers to its clients or customers. The application may implement a separate digital locker for each customer (or group of customers such as a family), or may implement a common digital locker that may be shared by some or all of the application's customers. The customers' virtual products may be loaded into the digital lockers in the application. For example, a product provider or digital locker service may be directed to load virtual products for customers into appropriate ones of the digital lockers. In some embodiments, the customers of the application may selectively instantiate their virtual products to expose the virtual products within the application. Alternatively, in some embodiments, all of a customer's virtual products in their digital locker may be visible to other customers. As an example, the application may be a social media application or site that provides digital lockers to members of the site. The members may obtain digital representations of items as virtual products, for example using one of the methods as illustrated in FIGS. 2 through 4 and 6 through 8, store those virtual products to their digital lockers of the social media site, and instantiate at least some of their virtual products on the social media application or site to expose the virtual products to other members of (or visitors to) the social media application or site.

Virtual Product Marketplace

Figure 13:
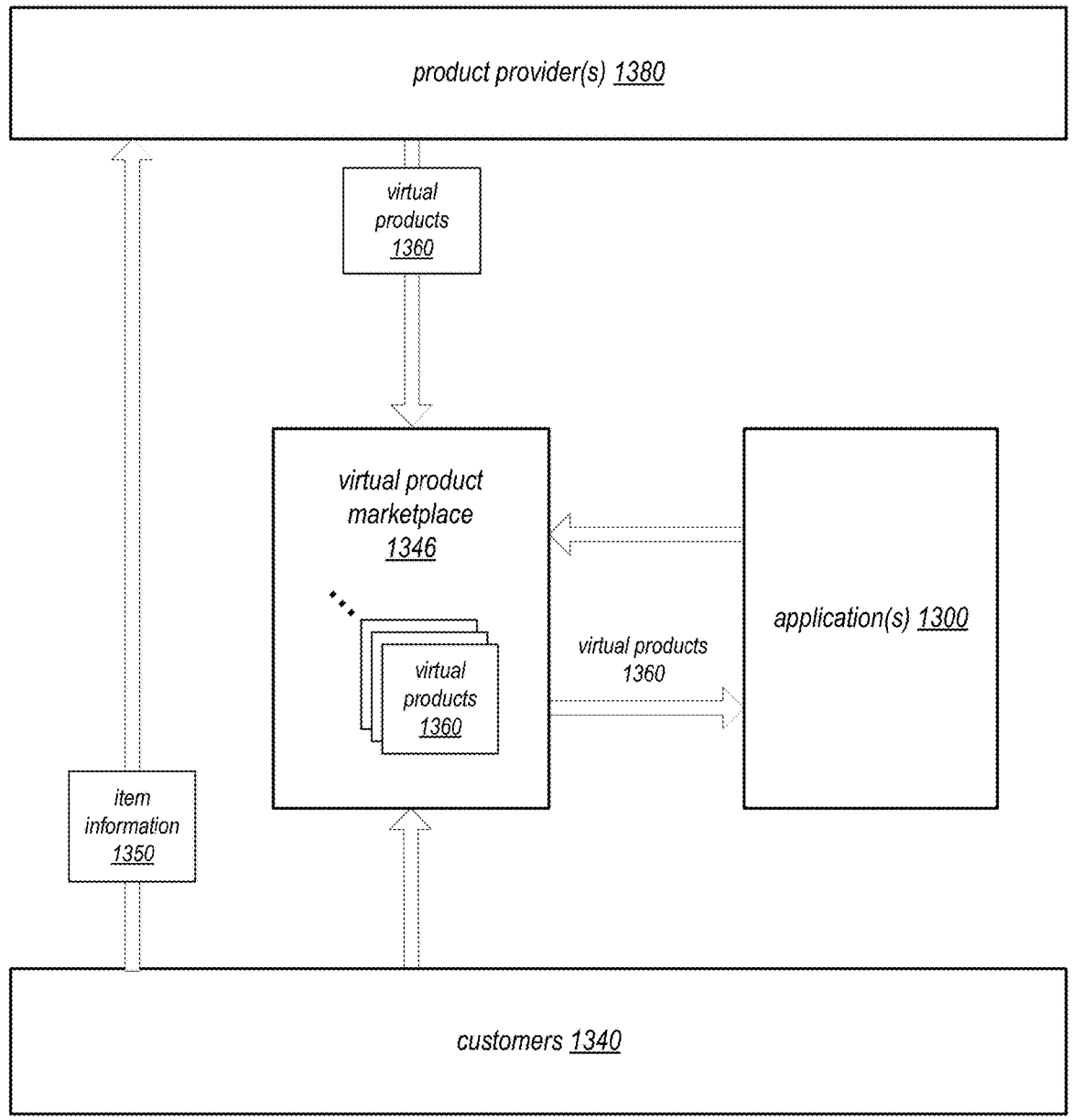
FIG. 13 graphically illustrates a marketplace for virtual products, according to at least some embodiments.

FIG. 13 graphically illustrates a marketplace for virtual products, according to at least some embodiments. In at least some embodiments, a product provider 1380 such as an online merchant as illustrated in FIG. 12, an application 1300, an application 1300 provider, or some other online presence or entity may provide a marketplace 1346 for virtual products 1360 obtained from sources including but not limited to product providers 1380. In some embodiments, the marketplace 1346 may only expose the obtained virtual products 1360 to customers 1340 within an application 1300. However, in some embodiments, the marketplace 1346 may expose the obtained virtual products 1360 to two or more applications 1300 for access by the applications 1300 and/or for access by customers 1340 of the applications 1300. The marketplace 1346 may provide an interface such as an API via which product providers 1380 may send virtual products 1360 to the marketplace 1346, for example virtual products 1360 obtained by customers 1340 using one or more of the methods as illustrated in FIGS. 2 through 4 and FIGS. 6 through 8. The marketplace 1346 may also provide an interface via which customers 1340 may browse virtual products 1360, select virtual products 1360, and obtain the selected virtual products 1360 for use in one or more applications 1300. An interface may also be provided via which customers 1340 may manage their virtual products 1360 within the marketplace 1346, for example to selectively make virtual products 1360 obtained from product providers 1380 available to other entities via the marketplace 1346. In some embodiments, the marketplace 1346 may also provide an interface such as an API via which application 1300 providers or application 1300 developers may view, select, and obtain virtual products 1360 for use within applications 1300 including but not limited to online games.

As an example, a customer 1340 may obtain digital representations of items as virtual products 1360 by providing item information 1350 such as digital photographs to a product provider 1380. The customer 1340 may direct the product provider 1380 to send the virtual products 1360 to a virtual product marketplace 1346 implemented by an online application. The customer 1340 may also direct the marketplace 1346 to make at least some of the virtual products 1360 available to other customers 1340 and/or to other applications 1300. Another customer 1340 may then view, select, and obtain one or more of the first customer's virtual products 1360 for use in one or more applications 1360. Alternatively, an application 1300 provider may view the customer's virtual products 1360 and obtain selected ones of the virtual products 1360 for instantiation in an application 1300. Note that the virtual product marketplace 1346 may offer the virtual products 1360 for free, or for a fee.

Example Network Environments

FIG. 12 graphically illustrates an example network environment in which embodiments of the various methods for providing virtual products to customers and leveraging virtual product usage information as illustrated in FIGS. 1 through 11 may be implemented. In at least some embodiments, the environment may include an online merchant, 1270, one or more applications 1200, and one or more client devices 1220. The environment may also include one or more product providers 1280 such as product manufacturers, distributors, or suppliers that may provide physical and/or virtual products to the online merchant 1270. Note that an online merchant 1270 may be considered a particular example of a product provider 1280.

Figure 15:
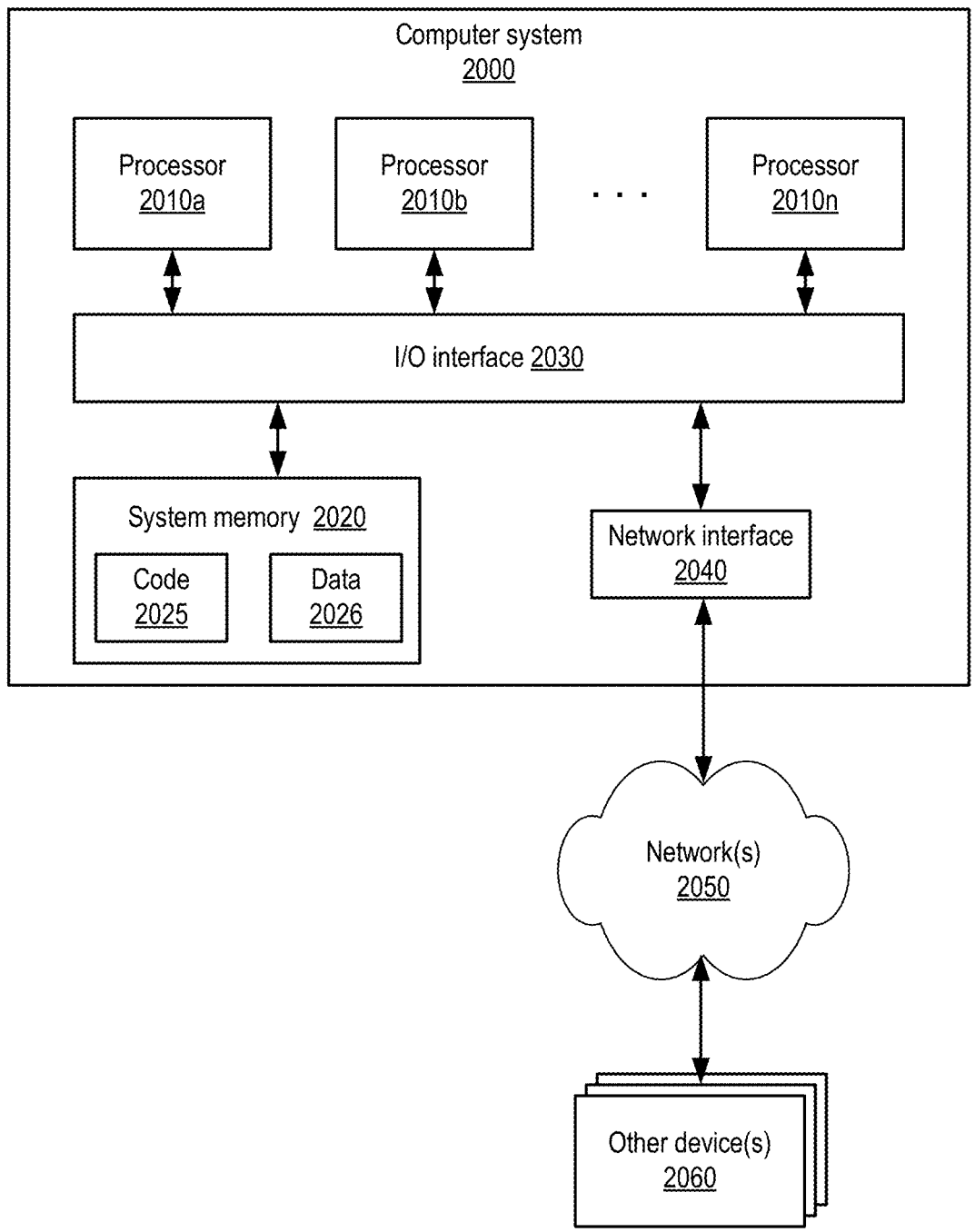
FIG. 15 is a block diagram illustrating an example computer system that may be used in some embodiments.

In at least some embodiments, an online merchant 1270 system may include one or more computing devices, for example one or more server devices, that implement online merchant logic including but not limited to one or more virtual product service modules 1274 that may implement functionality for providing and leveraging virtual products as described herein in relation to FIGS. 1 through 11. In at least some embodiments, virtual product service modules 1274 may provide one or more interfaces, for example application programming interfaces (APIs), via which customers 1240, applications 1200, and/or product providers 1280 may interact with online merchant logic to perform the virtual product-related methods as described herein. Online merchant 1270 system may also include other devices including but not limited to storage devices or servers that, for example, store or otherwise maintain or provide data such as customer information (e.g., accounts, registrations, names, addresses, contact information, billing information, shipping information, purchase history, etc.), product catalog 1272, digital lockers 1242, collected virtual product usage information 1290, and collected item information 1252. Online merchant 1270 system may also include computing devices that implement logic and interfaces for interacting with customers 1240 via client interfaces 1222 on client devices 1220, logic and interfaces for interacting with application(s) 1200, and logic and interfaces for interacting with product provider(s) 1280. An example computing device that may be used in an online merchant 1270 system is illustrated in FIG. 15.

An online merchant 1270 may provide a number of products from any number of providers 1280 for sale to customers 1240. These products may include, but are not limited to, physical goods, services, digital media, downloadable music, streaming movies, and the like. The online merchant 1270 may maintain a product catalog 1272 that includes product data 1268, for example the names and descriptions of the products, the prices and availability of the products, digital representations of the products such as 2D or 3D graphical representations, models, or images of the products, and so on. The product data 1268 may be generated by the online merchant 1270, or may be provided by or uploaded from providers 1280 such as product manufacturers, distributors, or suppliers as product information 1282. Via client devices 1220, customers 1240 may access the product data 1268 in the catalog 1272 through web sites, web applications, mobile applications and so on to search for, identify, and purchase particular physical products. At least some of the digital representations of the products in the catalog 1272 may be used as virtual products 1260 that may be provided to at least some customers 1240 of the online merchant 1270 for use in various applications 1200 as described herein.

The virtual products 1260 provided to the customers 1240 by the online merchant 1270 may be instantiated as virtual product (VP) instances 1262 within one or more application systems 1200 used by the customers 1240. As an example, an application system 1200 may be a game system that provides an online multiplayer game universe 1204 to multiple customers 1240 via client interfaces 1222. The application system 1200 manages application data, implements application logic, interacts with customers 1240 via client interfaces 1222 on client devices 1220, and serves as an execution environment for the application (e.g., for an online multiplayer game). In at least some embodiments, application system 1200 may include one or more computing devices, for example one or more server devices, that implement application logic, and may also include other devices including but not limited storage devices or servers that, for example, store or otherwise maintain or provide application data 1208. Application data 1208 may include any data or information that may be used by application system 1200, as well as any data or information that may be generated or collected by application system 1200. An example computing device that may be used in application system 1200 is illustrated in FIG. 15. However, in some embodiments, the functionality and components of an application system 1200 may be implemented at least in part on one or more of the client devices 1220, for example client devices 1220 participating in a peer-to-peer application such as a peer-to-peer gaming environment in which application functionality is distributed among two or more peer devices.

The application system 1200 may include one or more modules 1210 for monitoring and collecting virtual product usage information 1290 within the application environment. Monitoring and data collection 1210 component or module monitors virtual product 1260 use in the application 1200, collects usage data 1290 for the virtual products 1290, and provides the usage data 1290 to one or more product providers 1280 and/or to an online merchant 1270. In at least some embodiments, application programming interfaces (APIs) may be provided by the application system 1200 and/or by the product providers 1280 via which application 1200 and product providers 1280 including online merchant 1270 may establish interfaces, communications channels and protocols for communicating virtual product-related information including but not limited to the collected usage information 1290.

A client device 1220 may be any of a variety of consumer devices including but not limited to desktop computer systems, laptop/notebook computer systems, pad/tablet devices, smartphone devices, game consoles, handheld gaming devices, and wearable gaming devices. Wearable gaming devices may include, but are not limited to, gaming glasses or goggles and gaming "watches" or the like that are wearable on the wrist, arm, or elsewhere. A client device 1220 may include, but is not limited to, input and output components and client software (client interface(s) 1222) via which respective customers 1240 may, for example, interact with one or more application systems 1200 to participate in the application universe 1204, or interact with online merchant 1270 to submit product-related information. The product-related information may include one or more of, but is not limited to, product purchase information 1250 as described in reference to FIGS. 2 and 6, item information 1252 as described in reference to FIGS. 3 and 7, and product specifications or designs (not shown in FIG. 12) as described in reference to FIGS. 4 and 8. An example computing device that may be used as a client device 1220 is illustrated in FIG. 15.

In at least some embodiments, online merchant 1270 may provide a digital locker service may be provided via which digital lockers 1242 may be established for and provided to customers 1240. The digital locker service may provide an interface such as an API via which virtual products 1260 may be stored to customers' digital lockers 1242. The digital locker service may also provide an interface such as an API via which applications 1200 may access virtual products 1260 in customers' digital lockers 1242 to instantiate VP instances 1262 in virtual universes 1204. The digital locker service may also provide an interface via which customers 1240 may access and manage their digital lockers 1244 and the virtual products 1260 stored therein.

In at least some embodiments, online merchant 1270 may include a data analysis 1278 component that may analyze virtual product usage information 1290 and/or item information 1252 using one or more data analysis techniques to generate analysis results 1279. The analysis results 1279 may be used by the online merchant 1270 and/or may be provided to one or more product providers 1280. Alternatively, a product provider 1280 may receive virtual product usage information 1290 from one or more applications 1200 and may perform its own analysis of the information 1290. The analysis results 1279 may be applied by online merchant 1270 or by one or more product providers 1280 to one or more aspects of real-world production and marketing such as product design, manufacturing, distribution, advertising, and so on.

FIG. 14 illustrates an example network environment in which a merchant system may implement virtual product services as illustrated in FIGS. 1 through 12, according to at least some embodiments. The environment includes one or more clients 1990 that may access a merchant system 1900 across a network 1950. The network 1950 may be a local-area network ("LAN"), a wide-area network ("WAN"), the Internet, or any other networking topology known in the art that may connect client(s) 1990 to the merchant system 1900. A client 1990 may, for example, represent an individual or entity (also referred to herein as a "customer") that desires to browse and/or purchase items, for example items offered for sale by an online merchant. The items (also referred to herein as products) may include one or more of, but are not limited to, physical goods, digital media products, event tickets, media or service subscriptions, works such as books, movies, and albums, or in general any goods or services which can be purchased or otherwise obtained by a client 1990 of the merchant system 1900. The merchant system 1900 may include one or more servers 1910 that provide various online services to the clients 1990 over the network 1950. A client 1990 may use one or more client applications or interfaces to access and utilize the online services provided by servers 1910. A client application may, for example, be a web browser application.

Servers 1910 may execute a number of modules in order to provide the online services to the clients 1990. The modules may execute on a single server 1910 or across multiple servers 1910 in the merchant system 1900. In addition, each module may consist of a number of subcomponents executing on different application servers 1910 or other computing devices in the merchant system 1900. The modules may be implemented as software, hardware, or any combination of the two.

In at least some embodiments, a client interface module 1912 may retrieve information regarding a particular item offered for sale by the online merchant from product catalog 1922, generate item details containing at least some of the information regarding the particular item, and transmit the item details over the network 1950 to a client 1990. The item details may, for example, be presented or displayed by client 1990 as an item page. Any of various methods and technologies may be utilized that allow the client interface module 1912 to send the item details to the clients 1990 for display on or as an item page. The product catalog 1922 may, for example, be stored in a data store 1920, such as a database or other storage mechanism available to servers 1910 in the merchant system 1900. The product catalog 1922 may contain information regarding each item offered for sale by the merchant, including but not limited to digital representations of the items that may be used to virtual products to clients 1990 for use in applications 1970 as described herein.

In at least some embodiments, a virtual product service module 1914 may execute on one or more servers 1910 to implement and perform one or more of the methods as described in reference to FIGS. 1 through 12. For example, the virtual product service module 1914 may map physical products to virtual products, store virtual products to digital lockers 1924, provide virtual products to clients 1990 and/or applications 1970, collect, store, and analyze virtual product usage information 1926 from applications 1970, collect, store, and analyze item information 1928 (including but not limited to evidence of purchase or ownership) from clients 1990, and provide virtual product-related information to product providers 1980, for example according to the methods as illustrated in FIGS. 1 through 12. In at least some embodiments, virtual product service module 1914 may provide one or more interfaces, for example application programming interfaces (APIs), via which clients 1990, applications 1970, and/or product providers 1980 may interact with online merchant logic to perform the virtual product-related methods as described herein.

Illustrative System

In at least some embodiments, a computing device that implements a portion or all of the methods and apparatus as described herein may include a general-purpose computer system that includes or is configured to access one or more computer-accessible media, such as computer system 2000 illustrated in FIG. 15. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data as described herein in reference to FIGS. 1 through 12, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 12 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
 performing, by a product provider system implemented on one or more computing devices:
  receiving item information from one or more clients of the product provider system indicating particular physical items, the item information comprising:
   one or more photographs of the particular physical items, and purchase information for the particular physical items;
generating digital representations of the physical items according to the received item information;
verifying whether respective clients of the one or more clients have ownership of respective physical items based at least in part on:
   determining that the received item information comprises respective purchase information for the respective physical items; and
   determining that location metadata of the one or more photographs corresponds to stored customer information for the respective clients;
based at least in part on verifying that the respective clients have ownership of the respective physical items, providing the digital representations of the respective physical items to the respective clients as virtual products configured to be rendered within one or more applications external to the product provider system;
receiving, from the one or more applications, usage data for the digital representations as used by the respective clients; and
providing the usage data to respective product providers of the respective physical items.

2. The method as recited in claim 1, wherein the item information includes descriptions of the physical items, and wherein the purchase information comprises sales records for the physical items.

3. The method as recited in claim 1, wherein the item information indicates that at least some of the physical items were purchased from sources other than the product provider system.

4. The method as recited in claim 1, further comprising analyzing one or more sales receipts to determine pricing information for at least one physical item from sources other than the product provider system.

5. The method as recited in claim 1, further comprising generating an item page for a given physical item indicating one or more accessories, options, or other physical items purchased with or used with the given physical item.

6. The method as recited in claim 5, further comprising determining demographic information of customers who have purchased or used the one or more accessories, options, or other physical items with the given physical item.

7. The method as recited in claim 1, wherein said generating digital representations of the physical items according to the received item information comprises locating at least one of the physical items indicated by the item information in a product catalog and obtaining digital representations of the located items from the product catalog.

8. The method as recited in claim 1, wherein said generating digital representations of the physical items according to the received item information comprises generating a graphical model of at least one of the physical items according to a description of the physical item included in the item information.

9. The method as recited in claim 1, wherein said generating digital representations of the physical items according to the received item information comprises generating at least one digital representation by scanning or imaging a physical item similar to a physical item indicated by the item information.

10. The method as recited in claim 1, further comprising providing at least a portion of the received item information to one or more entities for application to one or more aspects of production and marketing for physical products.

11. The method as recited in claim 1, wherein the applications include one or more of game applications or social media applications.

12. The method as recited in claim 1, further comprising providing at least some of the virtual products to a virtual product marketplace configured to provide selected virtual products to clients and applications via one or more interfaces.

13. A non-transitory computer-readable storage medium storing program instructions that when executed on one or more computers cause the one or more computers to implement an application configured to:
   receive item information from one or more clients indicating that particular physical items, the item information for at least one physical item including a digital image of the respective physical item and purchase information for the respective physical item;
   determine digital representations of the physical items according to the received item information;
   verify that respective clients of the one or more clients have ownership of at least some of the physical items based at least in part on:
      determining that the received item information comprises the purchase information for the respective physical items; and
      determining that location metadata of the one or more photographs corresponds to stored customer information of the respective clients; and
   based at least in part on verifying that the respective clients have ownership of the respective physical items, provide digital representations of the at least some of the physical items indicated by the item information to respective clients as virtual products configured to be rendered within one or more applications;
   receive, from the one or more applications, usage data for the digital representations as used by the respective clients; and
   provide the usage data to respective product providers of the respective physical items.

14. The non-transitory computer-accessible storage medium as recited in claim 13, wherein, to determine digital representations of the physical items according to the received item information, the application is configured to locate at least one of the digital representations in a product catalog according to the received item information.

15. The non-transitory computer-accessible storage medium as recited in claim 13, wherein, to determine digital representations of the physical items according to the received item information, the application is configured to find a best match for a digital image of a physical item in an image database and obtain a digital representation of a physical item according to the best match.

16. A merchant system, comprising:
   one or more servers; and
   a module to execute on the one or more servers to:
      receive item information from one or more clients indicating physical items, the item information comprising:
         one or more photographs of the physical items, and
         purchase information for the physical items;
      generate digital representations of the physical items according to the item information;
      verify that the one or more clients have ownership of the physical items based at least in part on:
         determining that the item information comprises the purchase information for the physical items; and determining that location metadata of the one or more photographs corresponds to stored customer information of the respective clients; and based at least in part on the one or more clients having verified ownership of the physical items, provide the digital representations to respective ones of the one or more clients as virtual products configured to be rendered within one or more applications external to the merchant system;

receive, from the one or more applications, usage data for the digital representations as used by the respective clients; and provide the usage data to product providers of the physical items.

17. The merchant system as recited in claim 16, wherein the item information includes descriptions of the physical items.

18. The merchant system as recited in claim 16, wherein the item information indicates that at least some of the physical items were purchased from sources other than the merchant system, and wherein the module is further configured to analyze the item information to determine competitive pricing information for at least one physical item.

19. The merchant system as recited in claim 16, further comprising a client interface module executing on the one or more servers and configured to provide an item page indicating physical products or virtual products offered by the merchant system according to an analysis of the item information.

20. The merchant system as recited in claim 16, further comprising a digital locker service executing on the one or more servers and configured to provide digital lockers for storing digital content for clients of the merchant system, wherein at least some of the virtual products are stored by the module to the digital lockers of the respective clients.

* * * * *